United States Patent
Masaki et al.

(10) Patent No.: US 7,173,666 B1
(45) Date of Patent: Feb. 6, 2007

(54) SYSTEM AND METHOD FOR DISPLAYING A NON-STANDARD ASPECT RATIO IMAGE ON A STANDARD ASPECT RATIO MONITOR

(75) Inventors: Ichiro Masaki, Boxborough, MA (US); Vivek Sikri, Medford, MA (US); Nilesh Agarwalla, Randolph, MA (US); Keith Glen Fife, Stanford, CA (US)

(73) Assignee: SMaL Camera Technologies, Cambridge, MA (US)

( * ) Notice: Subject to any disclaimer, the term of this patent is extended or adjusted under 35 U.S.C. 154(b) by 653 days.

(21) Appl. No.: 10/225,925

(22) Filed: Aug. 22, 2002

(51) Int. Cl.
*H04N 7/01* (2006.01)

(52) U.S. Cl. .................. 348/445; 348/700; 348/556

(58) Field of Classification Search ............. 348/445, 348/555–556, 700, 561, 581, 580, 722; 715/798–800; 345/672, 682
See application file for complete search history.

(56) References Cited

U.S. PATENT DOCUMENTS

| | | | |
|---|---|---|---|
| 5,045,939 A * | 9/1991 | Okayama et al. ............ | 348/445 |
| 5,187,776 A * | 2/1993 | Yanker ......................... | 715/800 |
| 6,040,570 A | 3/2000 | Levine et al. | |
| 6,101,294 A | 8/2000 | McCaffrey et al. | |
| 6,417,867 B1 | 7/2002 | Hallberg | |
| 6,421,459 B1 | 7/2002 | Rowe | |
| 6,674,799 B2 * | 1/2004 | Rhee ........................... | 375/240.21 |
| 2003/0214603 A1 * | 11/2003 | Manning ..................... | 348/445 |

FOREIGN PATENT DOCUMENTS

| | | |
|---|---|---|
| DE | 1997 40 910 A1 | 3/1999 |
| EP | 1 119 188 A2 | 7/2001 |
| WO | WO 99/66560 A1 | 12/1999 |
| WO | WO 02/11426 A1 | 2/2002 |

OTHER PUBLICATIONS

"Autobrite, See What You've Been Missing", SMaL Camera Technologies, Brochure, 2001, 4 pages.

"SMal Camera Technologies Sets New Standards in Surveillance Cameras with Its V1000 and Ultra-Wide W3000 Lines of Cameras Featuring Autobrite™ Technology", SMaL Camera Technologies, Inc., Press Release, ISC 2001, Booth #667, CCTV Pavilion, 1 page.

(Continued)

*Primary Examiner*—Michael H. Lee
(74) *Attorney, Agent, or Firm*—Blakely Sokoloff Taylor & Zafman LLP

(57) ABSTRACT

An area is imaged with a non-standard aspect ratio, e.g. wide aspect ratio, digital imager to produce pixels of image data. At least a portion of the produced pixels of image data corresponding to the captured non-standard aspect ratio image is displayed beginning, for a given frame of pixels of image data, at a column of pixels of image data corresponding to a predetermined column of imaged pixels. The number of columns of display pixels is different than the number of columns of imaged pixels. Motion is detected in the imaged pixels so that a motion responsive portion of the imaged pixels corresponding to the captured non-standard aspect ratio image corresponding to a window of the imaged pixels having motion detected therein can be displayed.

27 Claims, 17 Drawing Sheets

OTHER PUBLICATIONS

"SMaL Camera Technologies Introduces Its CMOS VGA Imager Featuring Autobrite™ Technology and The Industry's Lowest Power Consumption", SMaL Camera Technologies, Inc., Press Release, CES 2001, Booth #4346, Digital Imaging Pavilion, 1 page.

"About SMaL Camera Technologies, Inc.", SMaL Camera Technologies, 2001, 1 page.

"SMaL Camera Technologies Introduces Its Wide Dynamic Range Digital Video Camera Featuring Autobrite™ Technology", SMaL Camera Technologies, Inc., Press Release, CES 2001, Booth #4346, Digital Imaging Pavilion, 1 page.

"SMaL Camera Technologies Introduces Its Super Thin Ultra-Pocket Digital Camera Featuring Autobrite™ Technology", SMaL Camera Technologies, Inc., Press Release, DES 2001, Booth #4346, Digital Imaging Pavilion.

"See What You've Been Missing", SMaL Camera Technologies, Inc., Brochure, 7 pages.

* cited by examiner

SYSTEM AND METHOD FOR DISPLAYING A NON-STANDARD ASPECT RATIO IMAGE ON A STANDARD ASPECT RATIO MONITOR

FIELD OF THE PRESENT INVENTION

The present invention is directed to a method and device for enabling a non-standard aspect ratio image to be displayed on a standard aspect ratio monitor. More specifically, the present invention is directed to displaying a non-standard aspect ratio image on a standard aspect ratio monitor without loss of resolution and displaying the most pertinent information of the non-standard aspect ratio image on a standard aspect ratio monitor.

BACKGROUND OF THE PRESENT INVENTION

Conventionally, display devices, such as standard televisions and computer monitors, have a 4:3 aspect ratio. The aspect ratio is the ratio between width of the display or imaging device vs. height of the display or imaging device. For example, if an image being displayed on a standard display device has a width of four inches and a height of three inches, the displayed image would have an aspect ratio of 4:3.

Since the standard aspect ratio for display devices, such as televisions and computer monitors, is 4:3, most typical imaging devices also have an aspect ratio of 4:3 to facilitate easy viewing of the imaged object or scene. However, in many applications, such as filming, automotive electronic mirroring, surveillance, or security monitoring, it is desirable to image at a non-standard aspect ratio or wide aspect ratio, wherein a wide aspect ratio image is a species of a non-standard aspect ratio image, so as to maximize the field of view for the corresponding imager.

The field of view is defined, as illustrated in FIG. 16, as the angle θ related to a dimension of an imager 25. For example, if the imager 25 has a vertical dimension of $I_1$, the corresponding field of view would be $\theta_1$. On the other hand, as illustrated by FIG. 16, if the imager 25 has a vertical dimension of $I_2$, the corresponding field of view would be $\theta_2$. The field of view, θ, is determined by the following equation: $\tan(\theta/2) = I/2f$, wherein I is defined as a dimension of the imager (horizontal or vertical) and f is the focal length of the imager. Thus, as the dimension (I) of the imager 25 increases, the field of view (θ) increases and, as illustrated by FIG. 16, more of the image 35 can be captured by the imager 25.

The film industry for many years has imaged at wider aspect ratios, such as 2.35:1 and 1.81:1, so as to provide a better viewing at theaters. Moreover, it has been desirable for various industries to have wider aspect ratio imagers as part of their systems to provide a more comprehensive captured image without image loss. For example, the automotive industry has desired a wider aspect ratio imager for vehicles to provide a driver with a better view of objects around the vehicle. The surveillance industry also has desired a wider aspect ratio imager to provide a wider and more precise view of the area being monitored without using noisy or failure prone mechanically panning imagers.

However, these wider imaging aspect ratios can cause a problem when trying to display the wider aspect ratio image directly on a standard display device having the standard aspect ratio of 4:3.

Conventionally, a standard display device is setup to accept the analog equivalent of 720 pixels/row if the pixels are rectangular, or 640 pixels/row when dealing with square pixels. Typical NTSC encoders are designed to work in either rectangular or square pixel mode, and can therefore accept either 720 or 640 pixel/row.

However, when imaging at a wider aspect ratio, the image will typically have more than 720 pixels/row if the pixels are rectangular, or more than 640 pixels/row when dealing with square pixels. Therefore, a typical NTSC encoder or standard display device cannot accept such image data directly and be able to display it in a meaningful manner. To address this problem, broadcast industry has developed various techniques for displaying non-standard aspect ratio images on standard aspect ratio display devices.

For example, one technique used to display non-standard aspect ratio images on standard aspect ratio display devices is letterboxing. Letterboxing is a method of displaying a non-standard aspect ratio image on a display at the image's original aspect ratio as illustrated in FIGS. 1 and 2. To letterbox a non-standard aspect ratio image 1 filled with objects 10, as illustrated in FIG. 1, the non-standard wide aspect ratio image 3 filled with objects 10, as illustrated in FIG. 2, is displayed over the entire width of the 4:3 aspect ratio display device 2 and black bars 4 are added to the top and bottom to achieve the correct aspect ratio. The larger the width of the non-standard aspect ratio image, the thicker the black bars must be; i.e., a 1.66:1 aspect ratio image would have very small black bars, compared to a 2.35:1 aspect ratio image being displayed on a 4:3 aspect ratio display. Even if a wide screen display device such as a 16:9 aspect ratio display, black bars would be needed, but the bars would be smaller than when using a 4:3 display device. Although letterboxing provides one way to display a non-standard aspect ratio image on a standard display device, the displayed image loses resolution and thus desired information within the image may not be properly displayed to be recognizable.

Another technique used to display non-standard aspect ratio images on standard aspect ratio display devices is "pan&scan." "Pan&scan" takes a non-standard aspect ratio image 1 filled with objects 10 of FIG. 1 and displays the non-standard aspect ratio image on a standard display device 2, as illustrated in FIG. 3, wherein the non-standard aspect ratio image's original height is maintained, but only a portion of the width of the non-standard aspect ratio image is employed to produce the 4:3 aspect ratio of the standard display device 2. Although "pan&scan" provides one way to display a non-standard aspect ratio image on a standard display device, "pan&scan" loses information 5 off the side(s) of the original image and can sometimes be very deceiving due to this loss of information.

As noted above, the various techniques to display a non-standard aspect ratio image on a standard display device provide images with various problems. Thus, it is desirable to provide a display method for a non-standard aspect ratio image to be displayed on a standard aspect ratio display device without losing resolution or information from the original image. Moreover, it is desirable to provide the best display resolution and size on the non-standard aspect ratio image as it is displayed on a standard aspect ratio display device. Lastly, it is desirable to display the most pertinent information being captured by a non-standard aspect ratio imager on a standard aspect ratio display device in real-time.

SUMMARY OF THE PRESENT INVENTION

One aspect of the present invention is a method of displaying an area of interest corresponding to at least a portion of a captured non-standard aspect ratio imaged scene, the portion being a displayable imaged area within the captured non-standard aspect ratio imaged scene. The method images a scene with a non-standard aspect ratio digital imager to produce a non-standard aspect ratio imaged scene from pixels of image data, the non-standard aspect ratio digital imager having a two-dimensional array of image sites, the two-dimensional array having a number of columns and a number of rows, each row of the two-dimensional array having a plurality of image sites such that an individual image site corresponds directly to a single column of the two-dimensional array, each image site producing a pixel of image data; displays at least a portion of the produced pixels of image data corresponding to the captured non-standard aspect ratio imaged scene beginning, for a given frame of pixels of image data, at a column of pixels of image data corresponding to a first predetermined column of the two-dimensional array of image sites, the displayed portion of the produced pixels image data having a number of columns of display pixels, the number of columns of display pixels being different than the number of columns of image sites; detects motion in the produced pixels of image data corresponding to the captured non-standard aspect ratio imaged scene; and displays, in response to the detection of motion in the produced pixels of image data corresponding to the captured non-standard aspect ratio imaged scene, a motion responsive portion of the produced pixels of image data corresponding to the captured non-standard aspect ratio imaged scene, the motion responsive portion of the produced pixels of image data corresponding to a window of the produced pixels of image data having motion detected therein.

A second aspect of the present invention is a method of displaying, using electronic panning, an area of interest corresponding to a portion of a captured non-standard aspect ratio imaged scene, the portion being a displayable imaged area within the captured non-standard aspect ratio imaged scene. The method images a wide area with a digital imager to produce pixels of image data, the digital imager having a two-dimensional array of image sites, the two-dimensional array having a number of columns and a number of rows, each row of the two-dimensional array having a plurality of image sites such that an individual image site corresponds directly to a single column of the two-dimensional array, each image site producing a pixel of image data; displays, using electronic panning, an electronic panned portion of the produced pixels of image data corresponding to the captured non-standard aspect ratio imaged scene beginning, for a given frame of pixels of image data, at a column of pixels of image data corresponding to a first predetermined column of the two-dimensional array of image sites, a beginning column of the displayed electronic panned portion being changed at a frame rate, the displayed electronic panned portion of the produced pixels image data having a number of columns of display pixels, the number of columns of display pixels being less than the number of columns of image sites; detects motion in the produced pixels of image data corresponding to the captured non-standard aspect ratio imaged scene; and displays, in response to the detection of motion in the produced pixels of image data corresponding to the captured non-standard aspect ratio imaged scene, a motion responsive portion of the produced pixels of image data corresponding to the captured non-standard aspect ratio imaged scene, the motion responsive portion of the produced pixels of image data corresponding to a window of the produced pixels of image data having motion detected therein.

A third aspect of the present invention is a method of displaying a portion of a captured non-standard aspect ratio imaged scene. The method generates a non-standard aspect ratio imaged scene with a non-standard aspect ratio digital imager; displays a portion of the non-standard aspect ratio imaged scene using a standard aspect ratio monitor; detects motion in the generated non-standard aspect ratio imaged scene; and displays, in response to the detection of motion in the generated non-standard aspect ratio imaged scene, a motion responsive portion of the non-standard aspect ratio imaged scene using the standard aspect ratio monitor, the motion responsive portion of the non-standard aspect ratio imaged scene corresponding to a window of the generated non-standard aspect ratio imaged scene having motion detected therein.

A fourth aspect of the present invention is a method of displaying on a single monitor, using electronic panning, multiple areas of interest of multiple imaged scenes, each area of interest corresponding to at least a portion of a captured non-standard aspect ratio imaged scene, the portion being a displayable imaged area within the captured non-standard aspect ratio imaged scene. The method images a plurality of scenes, each scene being imaged using a non-standard aspect ratio digital imager to produce pixels of imaged scene data, a display area of the single monitor being divided into a number of display areas, the number of display areas being equal to the number of non-standard aspect ratio digital imagers, each non-standard aspect ratio digital imager having a two-dimensional array of image sites, each two-dimensional array having a number of columns and a number of rows, each row of each two-dimensional array having a plurality of image sites such that an individual image site corresponds directly to a single column of the two-dimensional array, each image site producing a pixel of image data; and displays on a single monitor, using electronic panning, multiple electronic panned portions of the produced pixels of image data, each displayed electronic panned portion corresponding to at least a portion of a captured non-standard aspect ratio imaged scene beginning, for a given frame of pixels of image data, at a column of pixels of image data corresponding to a first predetermined column of the two-dimensional array of image sites, a beginning column of the displayed electronic panned portion being changed at a frame rate, each displayed electronic panned portion of the produced pixels image data having a number of columns of display pixels, the number of columns of display pixels being different than the number of columns of image sites.

A fifth aspect of the present invention is a method of displaying, using electronic panning, multiple areas of interest of multiple imaged scenes, each area of interest corresponding to at least a portion of a captured non-standard aspect ratio imaged scene, the portion being a displayable imaged area within the captured non-standard aspect ratio imaged scene. The method images a plurality of scenes, each scene being imaged using a non-standard aspect ratio digital imager to produce pixels of image data, each non-standard aspect ratio digital imager having a two-dimensional array of image sites, each two-dimensional array having a number of columns and a number of rows, each row of each two-dimensional array having a plurality of image sites such that an individual image site corresponds directly to a single column of the two-dimensional array, each image site producing a pixel of image data; displays on a single monitor, using electronic panning, multiple electronic panned portions of the produced pixels of image data, a display area of the single monitor being divided into a number of subdisplay areas, the number of subdisplay areas being equal to the number of digital imagers, each displayed electronic panned portion corresponding to at least a portion of a captured non-standard aspect ratio imaged scene beginning, for a given frame of pixels of image data, at a column of pixels of image data corresponding to a first predetermined column of the two-dimensional array of image sites, a beginning column of the displayed electronic panned portion being changed at a frame rate, each displayed electronic panned portion of the produced pixels image data having a number of columns of display pixels, the number of columns of display pixels being different than the number of columns of image sites; detects motion in the produced pixels of image data corresponding to the captured non-standard aspect ratio imaged scenes; and displays, in response to the detection of motion in the produced pixels of image data corresponding to the captured non-standard aspect ratio imaged scenes, a motion responsive portion of the produced pixels of image data corresponding to a window of the captured non-standard aspect ratio imaged scene having motion detected therein, the motion responsive portion overriding the displayed electronic panned portion associated with the captured non-standard aspect ratio imaged scene having motion detected therein such that the motion responsive portion is displayed in the display area associated with the captured non-standard aspect ratio imaged scene having motion detected therein.

A sixth aspect of the present invention is a method of displaying, using electronic panning, multiple areas of interest of multiple imaged scenes, each scene of interest corresponding to at least a portion of a captured non-standard aspect ratio imaged scene, the portion being a displayable imaged area within the captured non-standard aspect ratio imaged scene. The method images a plurality of scenes, each scene being imaged using a non-standard aspect ratio digital imager to produce pixels of image data, each non-standard aspect ratio digital imager having a two-dimensional array of image sites, each two-dimensional array having a number of columns and a number of rows, each row of each two-dimensional array having a plurality of image sites such that an individual image site corresponds directly to a single column of the two-dimensional array, each image site producing a pixel of image data; displays on a single monitor, using electronic panning, multiple portions of the produced pixels of image data, a display area of the single monitor being divided into a number of subdisplay areas, the number of subdisplay areas being equal to the number of digital imagers, each displayed portion corresponding to a portion of a captured non-standard aspect ratio imaged scene beginning, for a given frame of pixels of image data, at a column of pixels of image data corresponding to a first predetermined column of the two-dimensional array of image sites, a beginning column of the displayed electronic panned portion being changed at a frame rate, each displayed portion of the produced pixels image data having a number of columns of display pixels, the number of columns of display pixels being different than the number of columns of image sites; detects motion in the produced pixels of image data corresponding to the captured non-standard aspect ratio imaged scenes; and displays, in response to the detection of motion in the produced pixels of image data corresponding to the captured non-standard aspect ratio imaged scenes, a motion responsive portion of the produced pixels of image data corresponding to a window of the captured non-standard aspect ratio imaged scene having motion detected therein, the motion responsive portion overriding all panning displayed portions being displayed on the single monitor such that the displayed motion responsive portion fills the display area of the single monitor.

A seventh aspect of the present invention is an imaging device for enabling a displaying of an area of interest corresponding to at least a portion of a captured non-standard aspect ratio imaged scene, the portion being a displayable imaged area within the captured non-standard aspect ratio imaged scene. The imaging device includes a non-standard aspect ratio digital imager capable of producing pixels of image data of an area corresponding to the non-standard aspect ratio, the non-standard aspect ratio digital imager having a two-dimensional array of image sites, the two-dimensional array having a number of columns and a number of rows, each row of the two-dimensional array having a plurality of image sites such that an individual image site corresponds directly to a single column of the two-dimensional array, each image site producing a pixel of image data; an image processing circuit, operatively connected to the non-standard aspect ratio digital imager, to process the produced non-standard aspect ratio pixels of image data to enable a displaying of a portion of the produced pixels of image data corresponding to the captured non-standard aspect ratio imaged scene beginning, for a given frame of pixels of image data, at a column of pixels of image data corresponding to a first predetermined column of the two-dimensional array of image sites, the displayed portion of the produced pixels image data having a number of columns of display pixels, the number of columns of display pixels being different than the number of columns of image sites; and a motion detection circuit, operatively connected to the non-standard aspect ratio digital imager and the image processing circuit, to detect motion in the produced pixels of image data corresponding to the captured non-standard aspect ratio imaged scene. The image processing circuit processes, in response to detected motion, the produced non-standard aspect ratio pixels of image data to enable a displaying a motion responsive portion of the produced pixels of image data corresponding to the captured non-standard aspect ratio imaged scene, the motion responsive portion of the produced pixels of image data corresponding to a window of the produced pixels of image data having motion detected therein.

An eighth aspect of the present invention is an imaging device to enable a displaying, using electronic panning, of an area of interest corresponding to a portion of a captured non-standard aspect ratio imaged scene, the portion being a displayable imaged area within the captured non-standard aspect ratio imaged scene. The imaging device includes a non-standard aspect ratio digital imager to produce pixels of image data, the non-standard aspect ratio digital imager having a two-dimensional array of image sites, the two-dimensional array having a number of columns and a number of rows, each row of the two-dimensional array having a plurality of image sites such that an individual image site corresponds directly to a single column of the two-dimensional array, each image site producing a pixel of image data; an image processing circuit, operatively connected to the non-standard aspect ratio digital imager, to process the produced non-standard aspect ratio pixels of image data to enable a displaying of, using electronic panning, an electronic panned portion of the produced pixels of image data corresponding to the captured non-standard aspect ratio imaged scene beginning, for a given frame of pixels of image data, at a column of pixels of image data corresponding to a first predetermined column of the two-dimensional array of image sites, a beginning column of the displayed electronic panned portion being changed at a frame rate, the displayed electronic panned portion of the produced pixels image data having a number of columns of display pixels, the number of columns of display pixels being different than the number of columns of image sites; and a motion detection circuit, operatively connected to the non-standard aspect ratio digital imager and the image processing circuit, to detect motion in the produced pixels of image data corresponding to the captured non-standard aspect ratio imaged scene. The image processing circuit processes, in response to detected motion, the produced non-standard aspect ratio pixels of image data to enable a displaying a motion responsive portion of the produced pixels of image data corresponding to the captured non-standard aspect ratio imaged scene, the motion responsive portion of the produced pixels of image data corresponding to a window of the produced pixels of image data having motion detected therein.

A ninth aspect of the present invention is an imaging device to enable a displaying of at least a portion of a captured non-standard aspect ratio imaged scene. The imaging device includes a non-standard aspect ratio digital imager capable of producing a non-standard aspect ratio image; an image processing circuit, operatively connected to the non-standard aspect ratio digital imager, to process the produced non-standard aspect ratio image to enable a displaying of a portion of the non-standard aspect ratio image using a standard aspect ratio monitor; and a motion detection circuit, operatively connected to the non-standard aspect ratio digital imager and the image processing circuit, to detect motion in the produced non-standard aspect ratio imaged scene. The image processing circuit, in response to the detection of motion, processes the produced non-standard aspect ratio imaged scene to enable a displaying of a motion responsive portion of the non-standard aspect ratio imaged scene using the standard aspect ratio monitor, the motion responsive portion of the non-standard aspect ratio imaged scene corresponding to a window of the generated non-standard aspect ratio imaged scene having motion detected therein.

A tenth aspect of the present invention is an imaging device to enable a displaying of, using electronic panning, multiple areas of interest of multiple non-standard aspect ratio images, each area of interest corresponding to at least a portion of a non-standard aspect ratio image, the portion being a displayable image area within the non-standard aspect ratio image. The imaging device includes a plurality of non-standard aspect ratio digital imagers to produce a plurality of non-standard aspect ratio imaged scenes, each non-standard aspect ratio digital imager producing pixels of image data corresponding to a non-standard aspect ratio imaged scene, each non-standard aspect ratio digital imager having a two-dimensional array of image sites, each two-dimensional array having a number of columns and a number of rows, each row of each two-dimensional array having a plurality of image sites such that an individual image site corresponds directly to a single column of the two-dimensional array, each image site producing a pixel of image data; a display monitor to display images; and an image processing circuit, operatively connected to the non-standard aspect ratio digital imagers and the display monitor, to process the produced non-standard aspect ratio imaged scenes to enable a displaying of, using electronic panning, at least a portion of each non-standard aspect ratio imaged scene using a standard aspect ratio, each portion beginning, for a given frame of pixels of image data, at a column of pixels of image data corresponding to a first predetermined column of the two-dimensional array of image sites, a beginning column of the portion being changed at a frame rate. The display monitor displays, using electronic panning, each portion of the non-standard aspect ratio imaged scenes, each displayed portion of the produced pixels image data having a number of columns of display pixels, the number of columns of display pixels being different than the number of columns of image sites. The display monitor is divided into a number of subdisplay areas, the number of subdisplay areas being equal to the number of non-standard aspect ratio digital imagers, each subdisplay area displaying a portion of an associated non-standard aspect ratio imaged scene.

An eleventh aspect of the present invention is an imaging device to enable a displaying of, using electronic panning, multiple areas of interest of multiple non-standard aspect ratio imaged scenes, each area of interest corresponding to at least a portion of a non-standard aspect ratio imaged scene, the portion being a displayable image area within the non-standard aspect ratio imaged scene. The imaging device includes a plurality of non-standard aspect ratio digital imagers to produce a plurality of non-standard aspect ratio imaged scenes, each non-standard aspect ratio digital imager producing pixels of image data corresponding to a non-standard aspect ratio imaged scene, each non-standard aspect ratio digital imager having a two-dimensional array of image sites, each two-dimensional array having a number of columns and a number of rows, each row of each two-dimensional array having a plurality of image sites such that an individual image site corresponds directly to a single column of the two-dimensional array, each image site producing a pixel of image data; a display monitor to display images; an image processing circuit, operatively connected to the non-standard aspect ratio digital imagers and the display monitor, to process the produced non-standard aspect ratio imaged scenes to enable a displaying of, using electronic panning, at least a portion of each non-standard aspect ratio imaged scene using a standard aspect ratio, each portion beginning, for a given frame of pixels of image data, at a column of pixels of image data corresponding to a first predetermined column of the two-dimensional array of image sites, a beginning column of the portion being changed at a frame rate; and a motion detection circuit, operatively connected to the non-standard aspect ratio digital imagers and the image processing circuit, to detect motion in the produced wide aspect ratio images. The image processing circuit, in response to the detection of motion, processes the produced non-standard aspect ratio imaged scenes to enable a displaying of a motion responsive portion of the produced pixels of image data corresponding to a window of the non-standard aspect ratio imaged scene having motion detected therein, the motion responsive portion overriding the displayed portion associated with the non-standard aspect ratio imaged scene having motion detected therein such that the motion responsive portion is displayed in the display area associated with the non-standard aspect ratio imaged scene having motion detected therein. The display monitor displays, using electronic panning, each portion of the non-standard aspect ratio imaged scenes, each displayed portion of the produced pixels image data having a number of columns of display pixels, the number of columns of display pixels being different than the number of columns of image sites. The display monitor is divided into a number of subdisplay areas, the number of subdisplay areas being equal to the number of non-standard aspect ratio digital imagers, each subdisplay area displaying a portion of an associated non-standard aspect ratio imaged scene.

A twelfth aspect of the present invention is an imaging device to enable a displaying of, using electronic panning, multiple areas of interest of multiple non-standard aspect ratio imaged scenes, each area of interest corresponding to at least a portion of a non-standard aspect ratio imaged scene, the portion being a displayable image area within the non-standard aspect ratio imaged scene. The imaging device includes a plurality of non-standard aspect ratio digital imagers to produce a plurality of non-standard aspect ratio imaged scenes, each non-standard aspect ratio digital imager producing pixels of image data corresponding to a non-standard aspect ratio imaged scene, each non-standard aspect ratio digital imager having a two-dimensional array of image sites, each two-dimensional array having a number of columns and a number of rows, each row of each two-dimensional array having a plurality of image sites such that an individual image site corresponds directly to a single column of the two-dimensional array, each image site producing a pixel of image data; a display monitor to display images; an image processing circuit, operatively connected to the non-standard aspect ratio digital imagers and the display monitor, to process the produced non-standard aspect ratio imaged scenes to enable a displaying of, using electronic panning, at least a portion of each non-standard aspect ratio imaged scene using a standard aspect ratio, each portion beginning, for a given frame of pixels of image data, at a column of pixels of image data corresponding to a first predetermined column of the two-dimensional array of image sites, a beginning column of the portion being changed at a frame rate; and a motion detection circuit, operatively connected to the non-standard aspect ratio digital imagers and the image processing circuit, to detect motion in the produced non-standard aspect ratio imaged scenes. The display monitor displays, using electronic panning, each portion of the non-standard aspect ratio imaged scenes, each displayed portion of the produced pixels image data having a number of columns of display pixels, the number of columns of display pixels being different than the number of columns of image sites. The display monitor is divided into a number of subdisplay areas, the number of subdisplay areas being equal to the number of non-standard aspect ratio digital imagers, each subdisplay area displaying a portion of an associated non-standard aspect ratio imaged scene. The image processing circuit, in response to the detection of motion, processes the produced non-standard aspect ratio imaged scenes to enable a displaying of a motion responsive portion of the produced pixels of image data corresponding to a window of the non-standard aspect ratio imaged scene having motion detected therein, the motion responsive portion overriding all displayed portions being displayed on the display monitor such that the displayed motion responsive portion fills all the display area of the display monitor.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAILED DESCRIPTION OF THE PRESENT INVENTION

Figure 1:
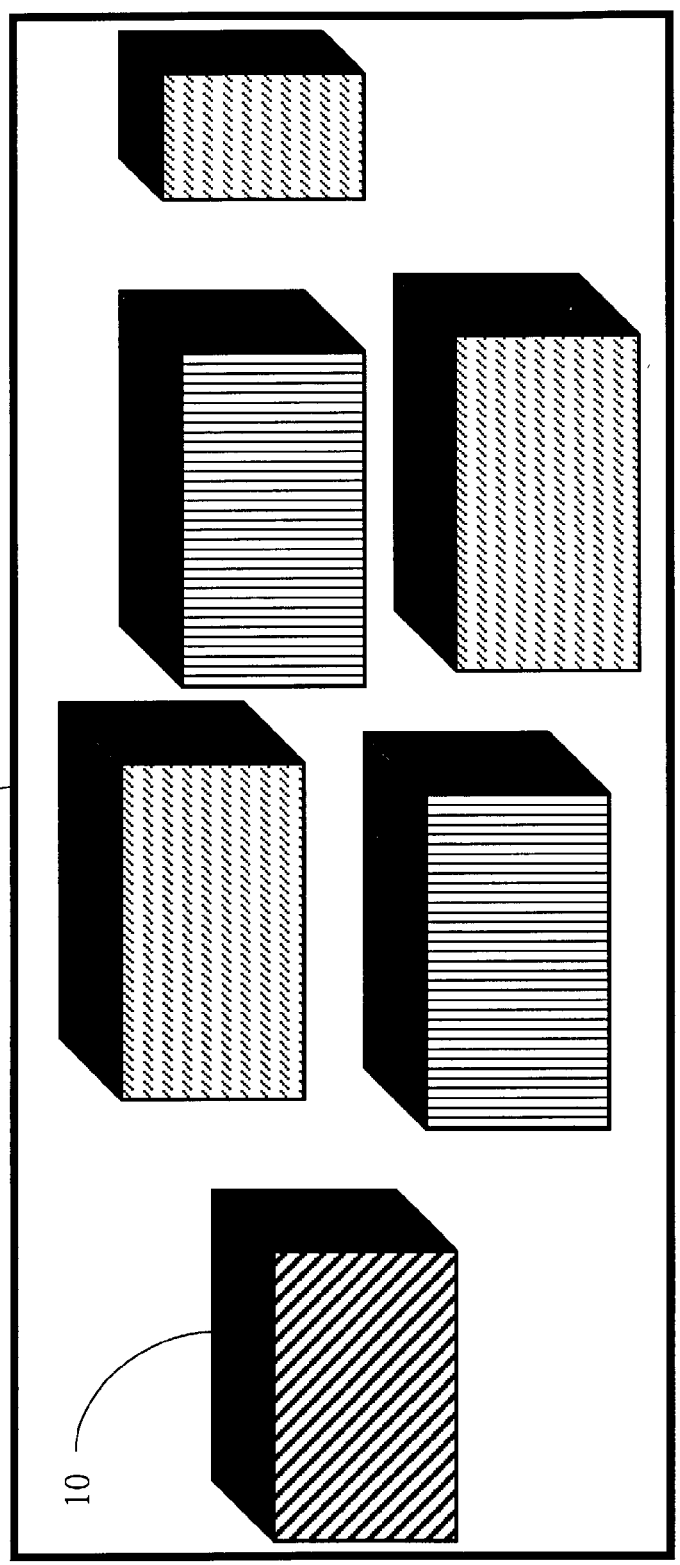
FIG. 1 illustrates an image produced by a non-standard aspect ratio imager.
Figure 2:
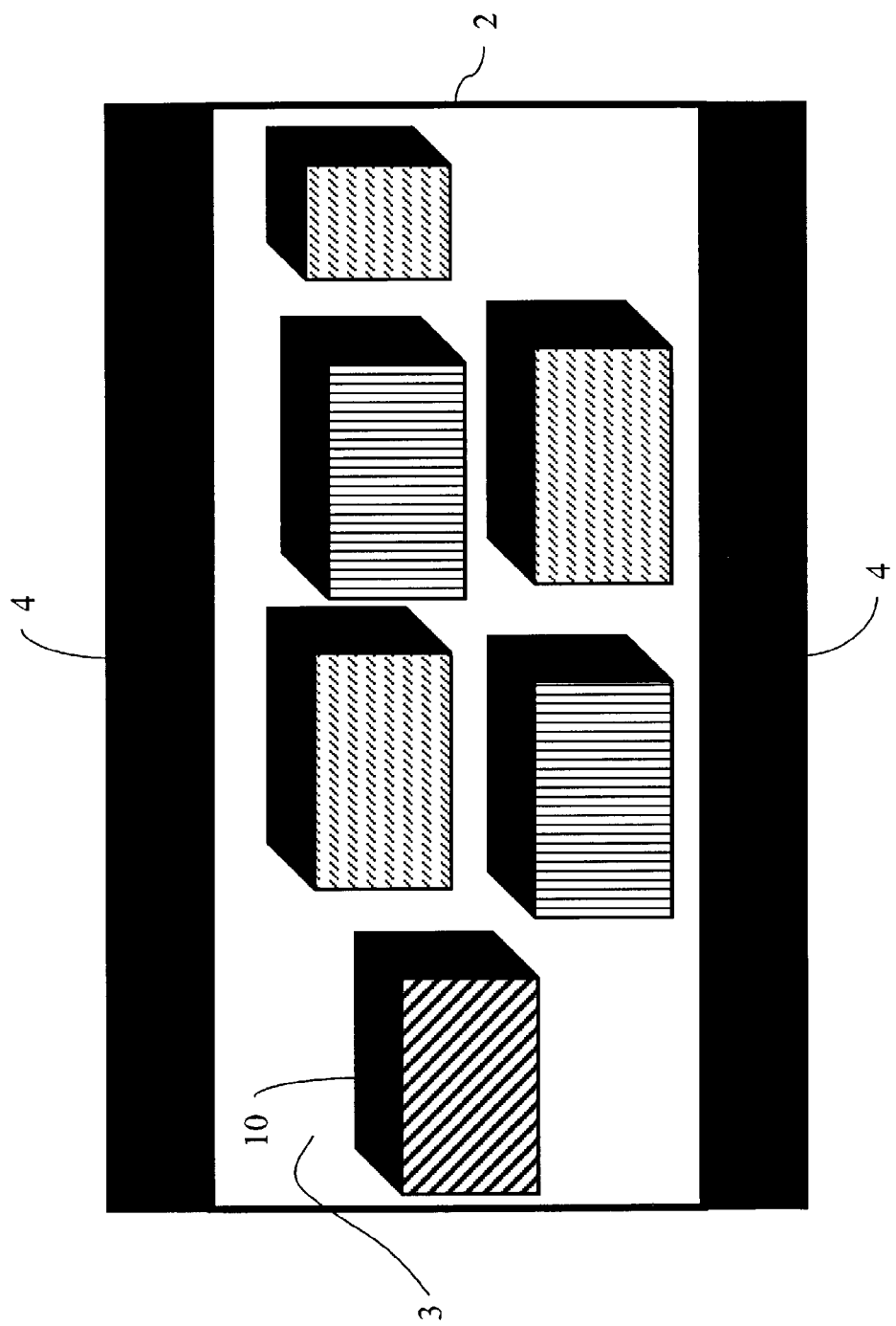
FIG. 2 illustrates letterboxing of a non-standard aspect ratio image.
Figure 3:
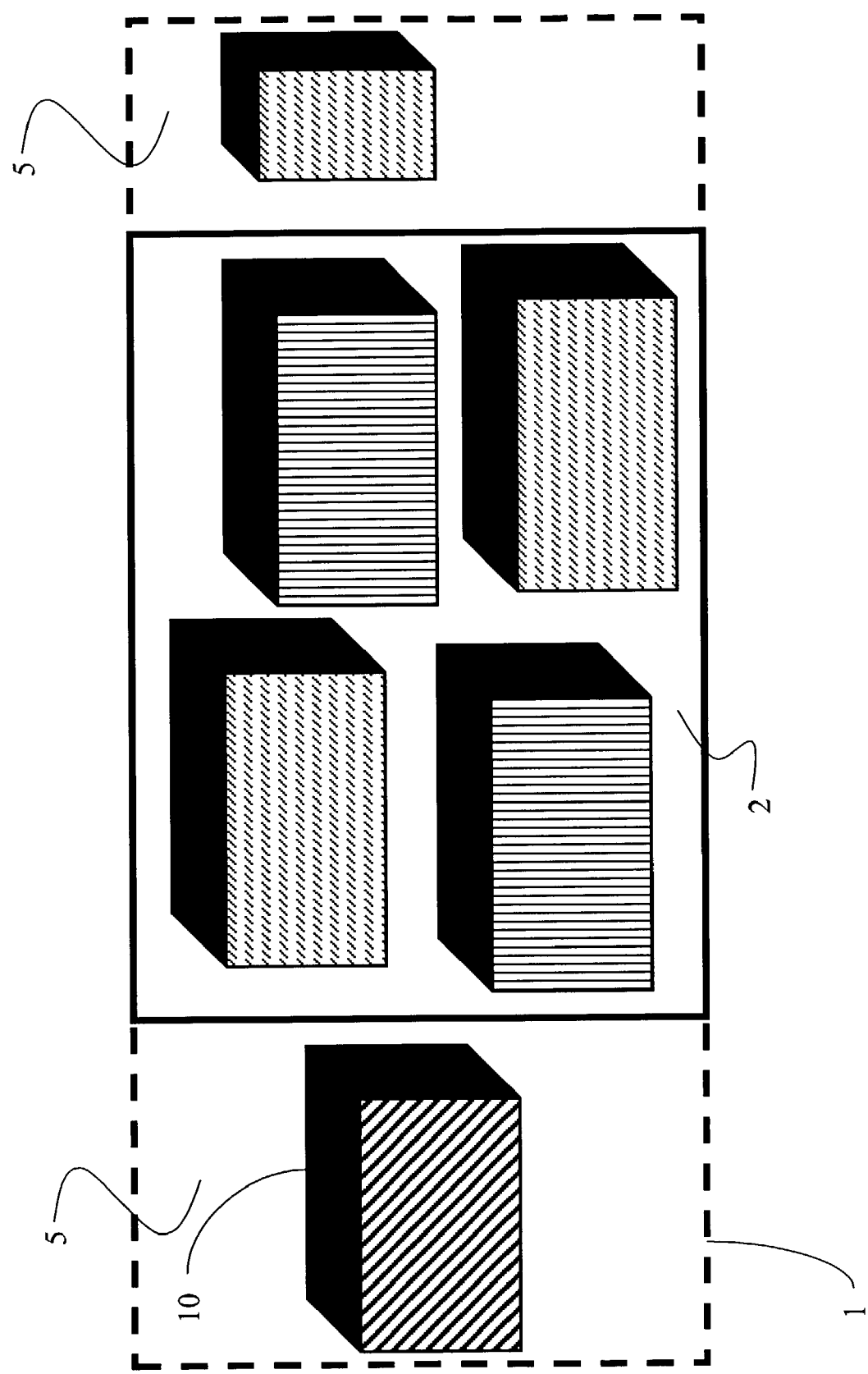
FIG. 3 illustrates "pan&scan" of a non-standard aspect ratio image.

The present invention will be described in connection with preferred embodiment; however, it will be understood that there is no intent to limit the present invention to the embodiments described herein. On the contrary, the intent is to cover all alternatives, modifications, and equivalents as may be included within the spirit and scope of the present invention as defined by the appended claims.

For a general understanding of the present invention, reference is made to the drawings. In the drawings, like reference have been used throughout to designate identical or equivalent elements.

For the purposes of explaining the concepts of the present invention, the term, "non-standard aspect ratio," will be used in describing imaged scenes, images, and imagers. As noted above, aspect ratio is defined as the ratio between width of the display or imaging device vs. height of the display or imaging device. For example, a standard aspect ratio display device has an aspect ratio of 4:3. Moreover, a standard aspect ratio imager has an aspect ratio of 4:3. A non-standard aspect ratio display device or a non-standard aspect ratio imager has an aspect ratio not equal to 4:3.

In a preferred embodiment of the present invention, a non-standard aspect ratio imager is employed, having an aspect ratio of 12:3. This non-standard aspect ratio imager is referred to as a wide aspect ratio imager in describing the various embodiments of the present invention below. As noted above, a wide aspect ratio imager is merely one example or a species of non-standard aspect ratio imagers. Although the various embodiments are described with respect to a wide aspect ratio imager, the concepts of the present invention are readily applicable to any non-standard aspect ratio imager, scene, or image, e.g., an imager having an aspect ratio less than 4:3.

As noted above, it is desirable to provide for a non-standard aspect ratio; for example, wide aspect ratio; image of a desired field of view to be displayed on a standard aspect ratio display device without losing resolution or information from the original image.

In describing the various embodiments of the present invention described below, the non-standard aspect ratio imager of the preferred embodiments used to produce the captured non-standard aspect ratio imaged scenes will be presumed to be a wide aspect ratio CMOS imager that has square pixels. To provide specificity of description, the wide aspect ratio CMOS imager will be presumed to include 1922 active pixels per row and 482 active rows per frame. It is to be recognized, however, that this particular example is provided for discussion purposes only and such is not required by the present invention; other imagers, e.g., CCD imagers, can be employed in accordance with the present invention, and other non-standard imager configurations can be employed in accordance with the present invention.

The wide aspect ratio CMOS imager, used in describing the various embodiments below, has a single extra pixel on either end of the array of pixel image sites wherein these extra pixels of image data can be used in image processing algorithms such as bilinear interpolation. The wide aspect ratio CMOS imager, used in describing the various embodiments below, also has a single extra row of pixel image sites on the top and bottom of the imager wherein these extra pixels of image data in these rows can also be used in image processing algorithms.

In other words, the wide aspect ratio CMOS imager, used in describing the various embodiments below, has 1922 pixels per row of which 1920 of the pixels per row are actually considered part of the captured wide aspect ratio image. The 1920 of the pixels per row of actual image data are equivalent to three side-by-side VGA-size rows wherein VGA has 640 pixels per row.

Moreover, the wide aspect ratio CMOS imager, used in describing the various embodiments below, enables the capturing of a wide field of view without physically moving the imager. The wide aspect ratio CMOS imager, used in describing the various embodiments below, also enables the capturing of a wide field of view without the use of a conventional fisheye lens, thereby providing a wide field of view of a particular area without mechanical movement and without image distortion caused by a conventional fisheye lens.

As noted above, a standard aspect ratio display device is set up to accept the analog equivalent of 720 pixels per row if the pixels are rectangular or 640 pixels per row is the pixels are square. Therefore, it is a desire of the present invention to be able to provide the displaying of a captured wide aspect ratio image on a standard aspect ratio display device without loss of pertinent information or distortion due to loss of resolution and size.

Figure 4:
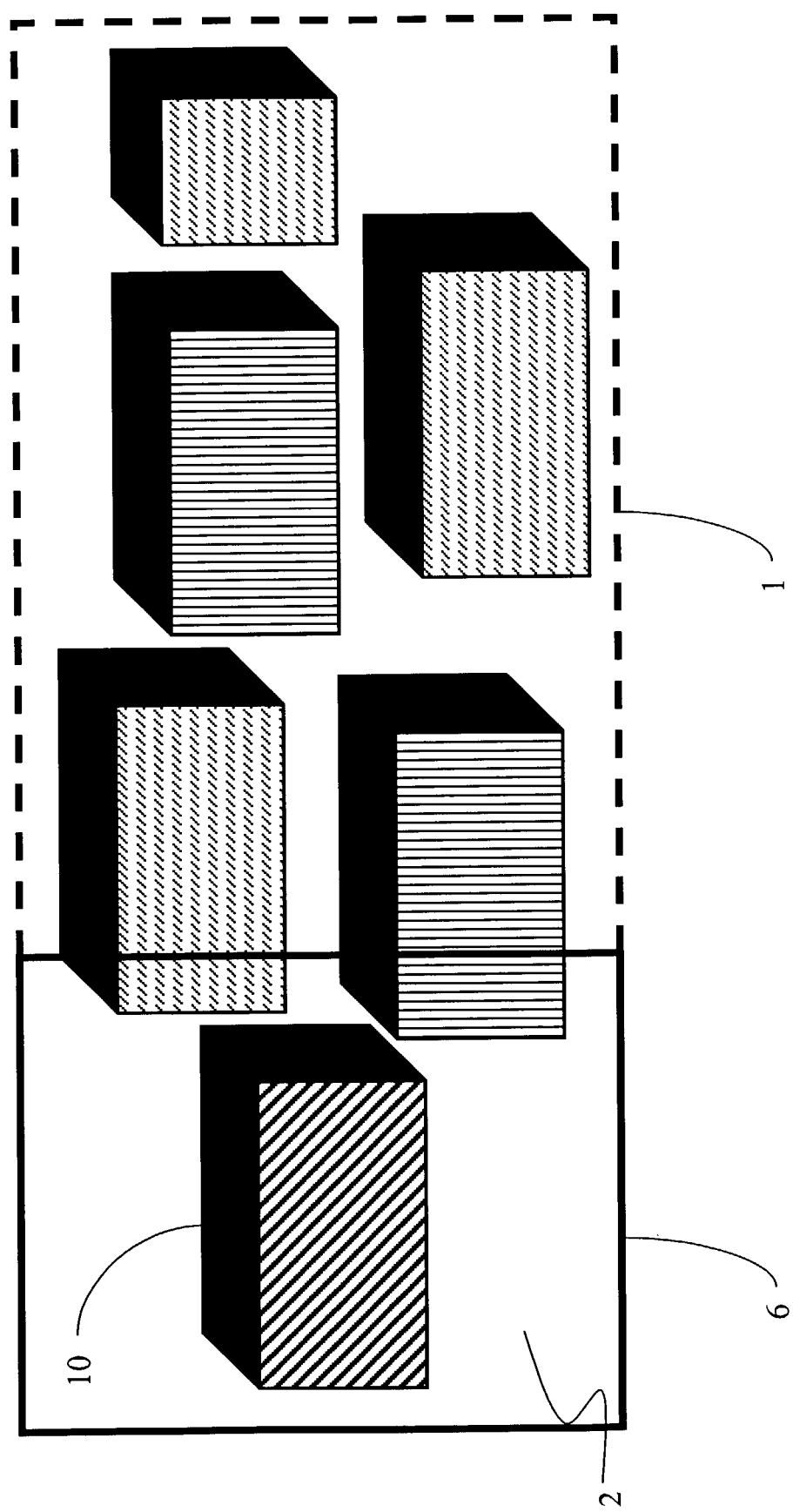
FIG. 4 illustrates a first $\frac{1}{3}^{rd}$ of a non-standard aspect ratio captured image being displayed according to the concepts of the present invention.
Figure 5:
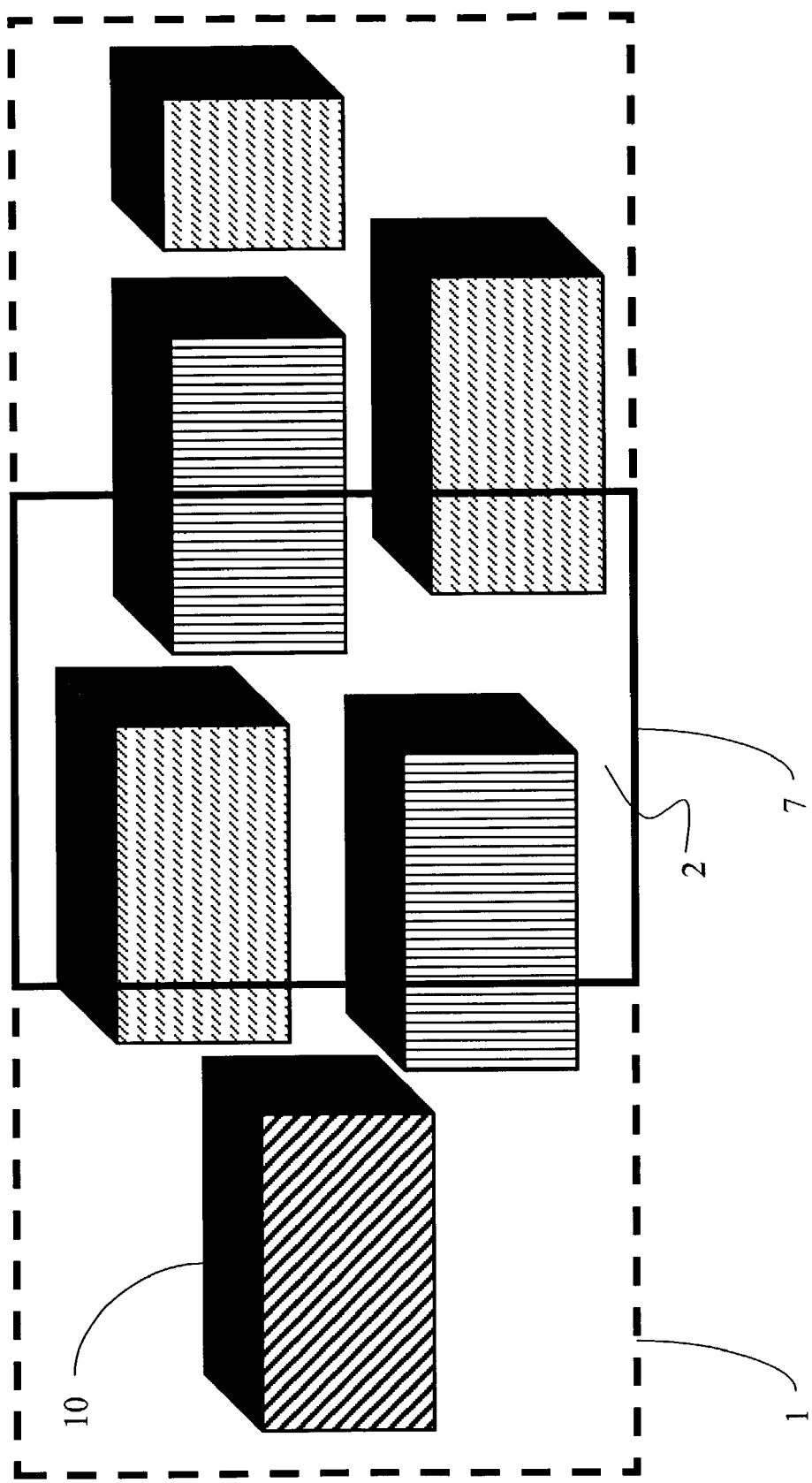
FIG. 5 illustrates a second $\frac{1}{3}^{rd}$ of a non-standard aspect ratio captured image being displayed according to the concepts of the present invention.
Figure 6:
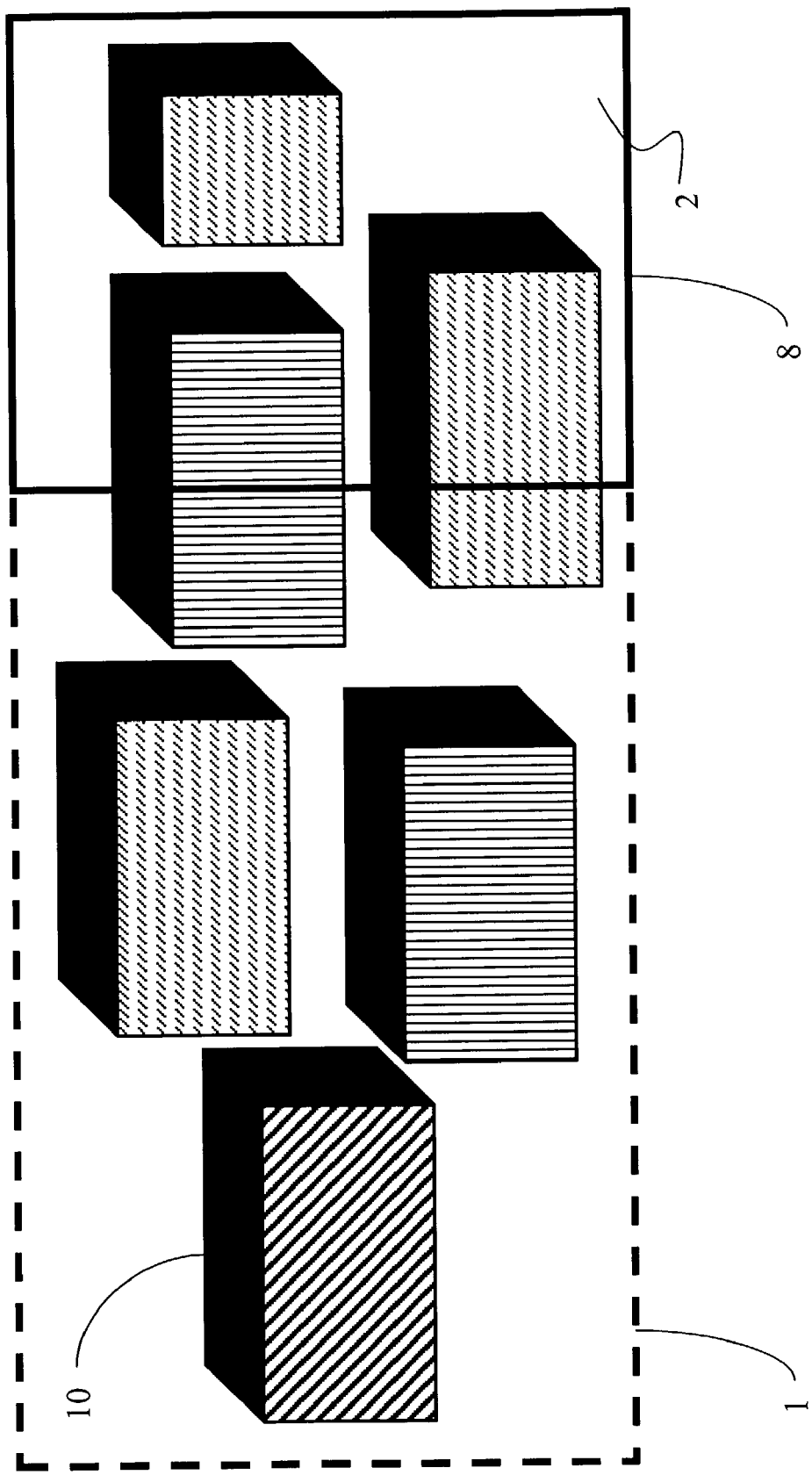
FIG. 6 illustrates a last $\frac{1}{3}^{rd}$ of a non-standard aspect ratio captured image being displayed according to the concepts of the present invention.

FIGS. 4–6 illustrate one embodiment of the present invention that enables the displaying of a captured wide aspect ratio image on a standard aspect ratio display device.

FIG. 4 illustrates a portion of a captured non-standard aspect ratio, here a wide aspect ratio, image being displayed on a standard aspect ratio display device utilizing the concepts of the present invention. More specifically, a captured wide aspect ratio image 1, containing various objects 10, is processed, according to the concepts of the present invention, such that a first $3^{rd}$ (6) of the captured wide aspect ratio image 1 is displayed on a standard aspect ratio display device 2. In this embodiment, the first $3^{rd}$ (6) of the captured wide aspect ratio image 1 is displayed on the standard aspect ratio display device 2 for a predetermined period of time. Thereafter, as illustrated in FIG. 5, a second $3^{rd}$ (7) of the captured wide aspect ratio image 1, containing various objects 10, is displayed on the standard aspect ratio display device 2. The second $3^{rd}$ (7) of the captured wide aspect ratio image 1 is also displayed on display device for the predetermined period of time.

Finally, thereafter, the last $3^{rd}$ (8) of the captured wide aspect ratio image 1, containing various objects 10, as illustrated in FIG. 6, is displayed on the standard aspect ratio display device 2. The last $3^{rd}$ (8) of the captured wide aspect ratio image 1 is displayed on the standard aspect ratio display device 2 for the predetermined period of time.

The $\frac{1}{3}^{rd}$ portions of the captured wide aspect ratio image 1 are displayed in sequence on the standard aspect ratio display device 2 such that the entire captured wide aspect ratio image can be viewed through the standard aspect ratio display device 2.

With respect to FIGS. 4–6, the imager is a CMOS imager having square pixels, wherein the active number of pixels per row is 1922. As noted before, a single extra pixel on either end of a row can be utilized with image processing algorithms such as bilinear interpolation. Moreover, the examples illustrated in FIGS. 4–6, utilize a standard aspect ratio display device 2 that typically contains 640 square pixels per row and 480 rows per frame. Therefore, as illustrated in FIG. 4, columns 1 through 640 of the captured wide aspect ratio image 1 are displayed as the first $3^{rd}$ (6) of the captured wide aspect ratio image 1 on the standard aspect ratio display device 2. In other words, the captured wide aspect ratio image 1, as illustrated by the dashed line box, is the entire image captured by the wide aspect ratio imager; however, only the portion of the captured wide aspect ratio image 1 which corresponds to the solid box 6 is displayed on the standard aspect ratio display device 2, the solid box 6 representing the first $3^{rd}$ of the captured wide aspect ratio image 1.

As illustrated in FIG. 5, columns 641 through 1280 of the captured wide aspect ratio image 1 are display as the second $3^{rd}$ (7) of the captured wide aspect ratio image 1 on the standard aspect ratio display device 2. In other words, the captured wide aspect ratio image 1, as illustrated by the dashed line box is the entire image captured by the wide aspect ratio imager; however, only the portion of the captured wide aspect ratio image 1 which corresponds to the solid box 7 is displayed on the standard aspect ratio display device 2, the solid box 7 representing the second $3^{rd}$ of the captured wide aspect ratio image.

As illustrated in FIG. 6, columns 1281 through 1920 of the captured wide aspect ratio image 1 are display as the last $3^{rd}$ (8) of the captured wide aspect ratio image 1 on the standard aspect ratio display device 2. In other words, the captured wide aspect ratio image 1, as illustrated by the dashed line box is the entire image captured by the wide aspect ratio imager; however, only the portion of the captured wide aspect ratio image 1 which corresponds to the solid box 8 is displayed on the standard aspect ratio display device 2, the solid box 8 representing the last $3^{rd}$ of the captured wide aspect ratio image.

Figure 7:
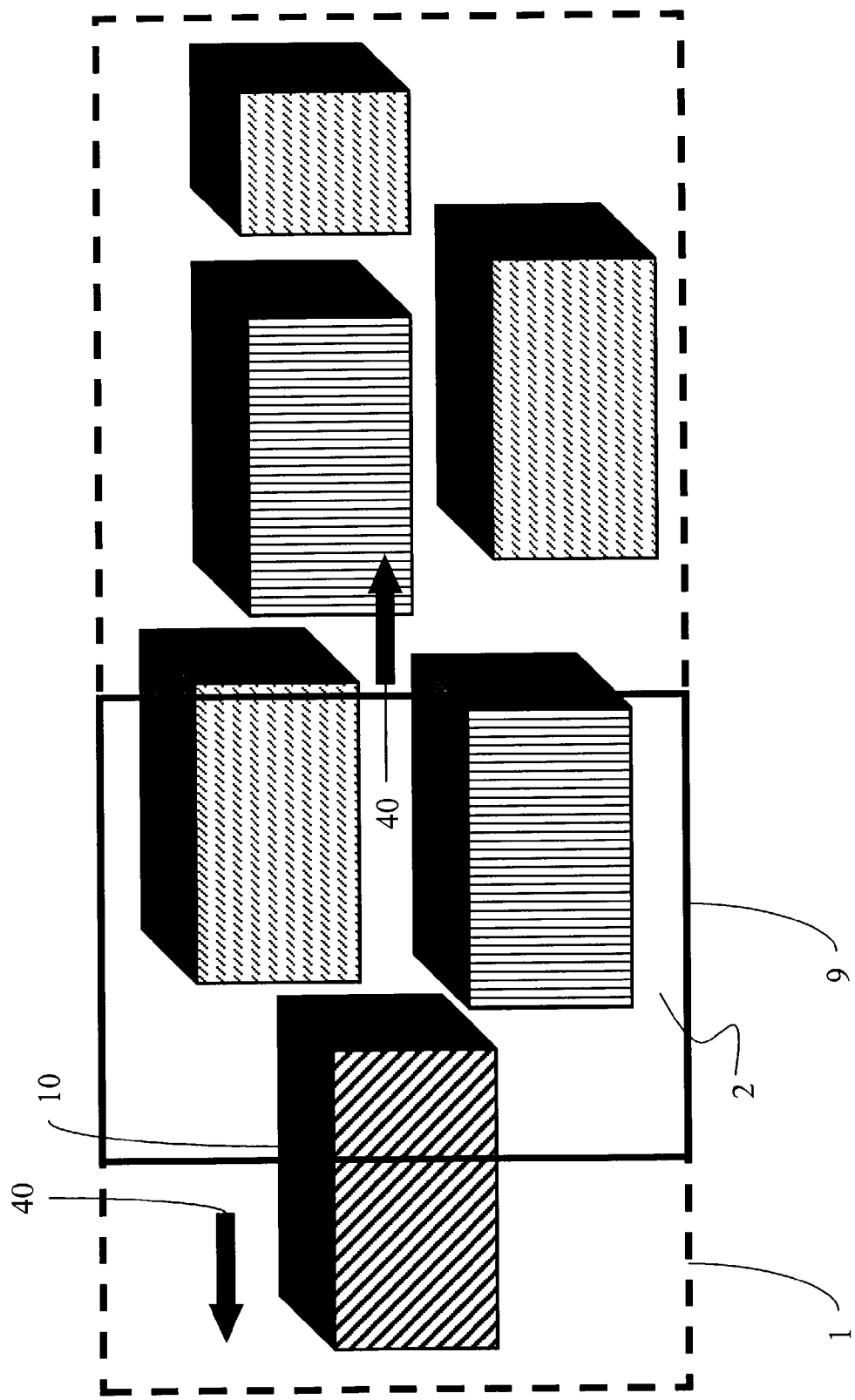
FIG. 7 illustrates a manual electronic panning of a non-standard aspect ratio captured image being displayed according to the concepts of the present invention.

In another embodiment of the present invention, a portion of the captured wide aspect ratio image 1 is displayed on a standard aspect ratio display device 2, as illustrated in FIG. 7. In this embodiment, manual electronic panning across (as represented by arrows 40) the entire captured wide aspect ratio image 1 is enabled for the user or observer to display a selected portion of the captured wide aspect ratio image 1. As illustrated in FIG. 7, an electronic panning box 9 can be manually moved in either direction so that a portion of the captured wide aspect ratio image 1 can be displayed on the standard aspect ratio display device 2. More specifically, the electronic panning box 9 represents 640 columns by 480 rows of pixel data from the wide aspect ratio imager. The manual selection of the portion of the captured wide aspect ratio image 1 to be displayed on the standard aspect ratio display device 2 can be selected or controlled by a user through any conventional input device, such as a keyboard, a mouse, a joystick, a touch pad, a speech recognition system, etc.

Moreover, with respect to FIG. 7, the electronic panning box 9 can continue to display the same area of the captured wide aspect ratio image 1 until the system receives a command to change the location of the electronic panning box 9 to another particular area of the captured wide aspect ratio image 1.

Figure 8:
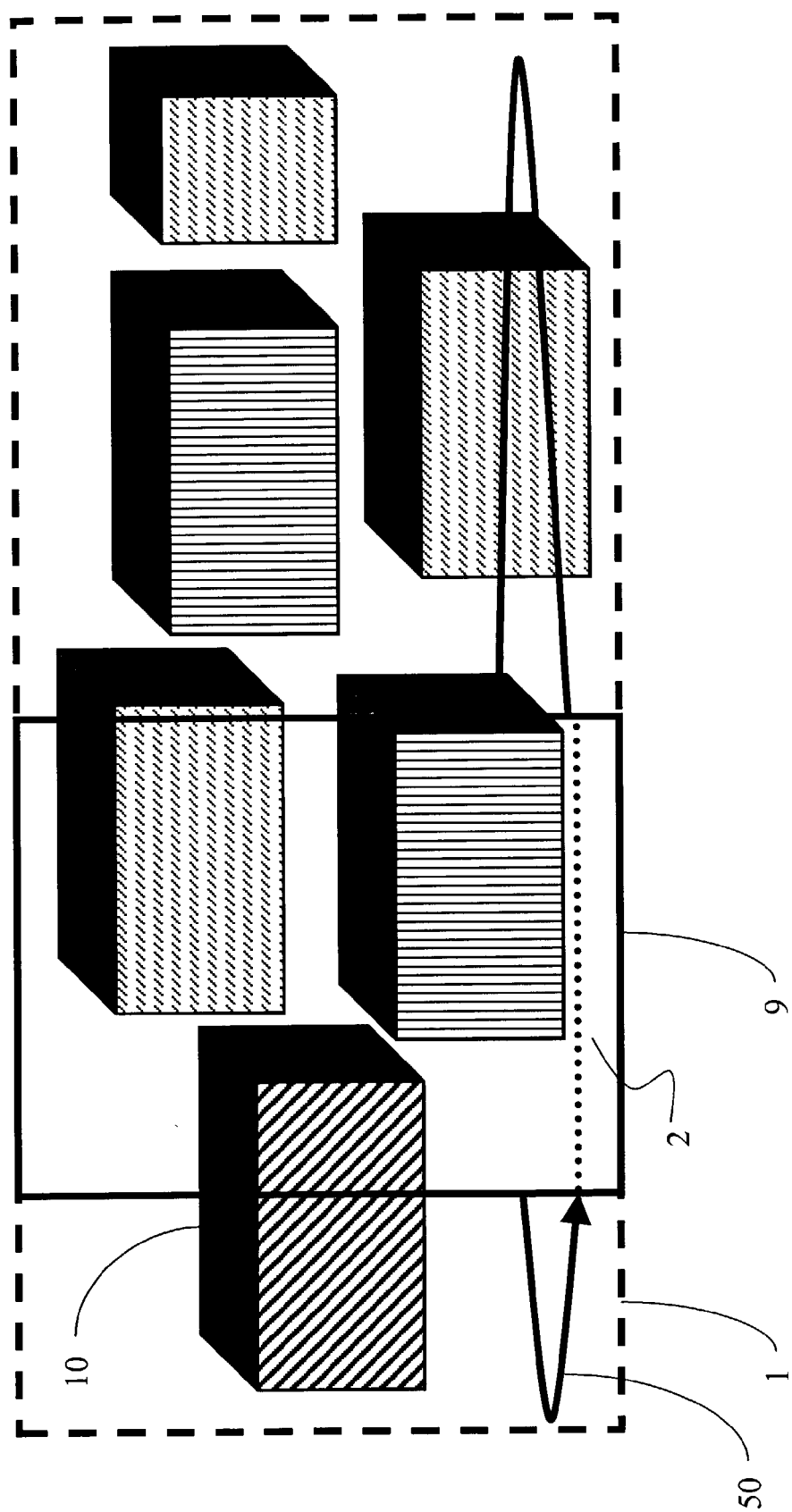
FIG. 8 illustrates an automatic electronic panning of a non-standard aspect ratio captured image being displayed according to the concepts of the present invention.

In a further embodiment of the present invention, as illustrated in FIG. 8, an electronic panning box 9 is automatically moved across (as represented by solid/dashed line 50) the captured wide aspect ratio image 1 so that the standard aspect ratio display device 2 displays a virtual panning of the total field of view of the wide aspect ratio imager. In other words, in the embodiment illustrated by FIG. 8, the electronic panning box 9 automatically slides across the entire width of the captured wide aspect ratio image 1.

In a preferred embodiment, the electronic panning box 9 represents 640 columns by 480 rows of pixel data from the wide aspect ratio imager. The electronic panning box 9 starts on the leftmost 640 columns then shifts the displayed section across the 1920 columns of the captured wide aspect ratio image 1 towards the right on a frame by frame basis. When the displayed section of the electronic panning box 9 lines up with the rightmost 640 columns of the 1920 columns of the captured wide aspect ratio image 1, the electronic panning box 9 reverses direction and slides back towards the left edge of the captured wide aspect ratio image 1. This electronic panning technique is then continued for subsequent captured image frames.

It is noted, that instead of reversing direction, when the electronic panning box 9 reaches the rightmost 640 columns of the captured wide aspect ratio image 1, the electronic panning box 9 may be shifted immediately to the leftmost 640 columns of the captured wide aspect ratio image 1.

The speed of the electronic panning across the captured wide aspect ratio image 1 can be adjustable either by setting the number of columns that the electronic panning box 9 shifts every frame or by setting the number of frames that are displayed between the shifting of the electronic panning box 9 across the captured wide aspect ratio image 1 or a combination of both. Furthermore, the speed of the electronic panning across the captured wide aspect ratio image 1 can be predetermined, and thus set automatically, or set manually through a conventional user input device.

In this embodiment, as illustrated in FIG. 8, the output generated by the standard aspect ratio display device 2 looks similar to that of a mechanically panned imager. More specifically, the display gives the appearance of the use of a standard aspect ratio imager that has been mechanically panned to image the entire field of view captured by a wide aspect ratio imager.

By utilizing a non-standard aspect ratio, here a wide aspect ratio, imager and not requiring the imager to mechanically pan to capture and image the entire desired field of view, the entire desired field of view can be captured every frame. In this regard, the non-visible area, with respect to the standard aspect ratio display device 2, can still be monitored electronically in real-time or this information can be stored for later analysis, and thus the captured image information, although not constantly displayed, is not lost.

Figure 9:
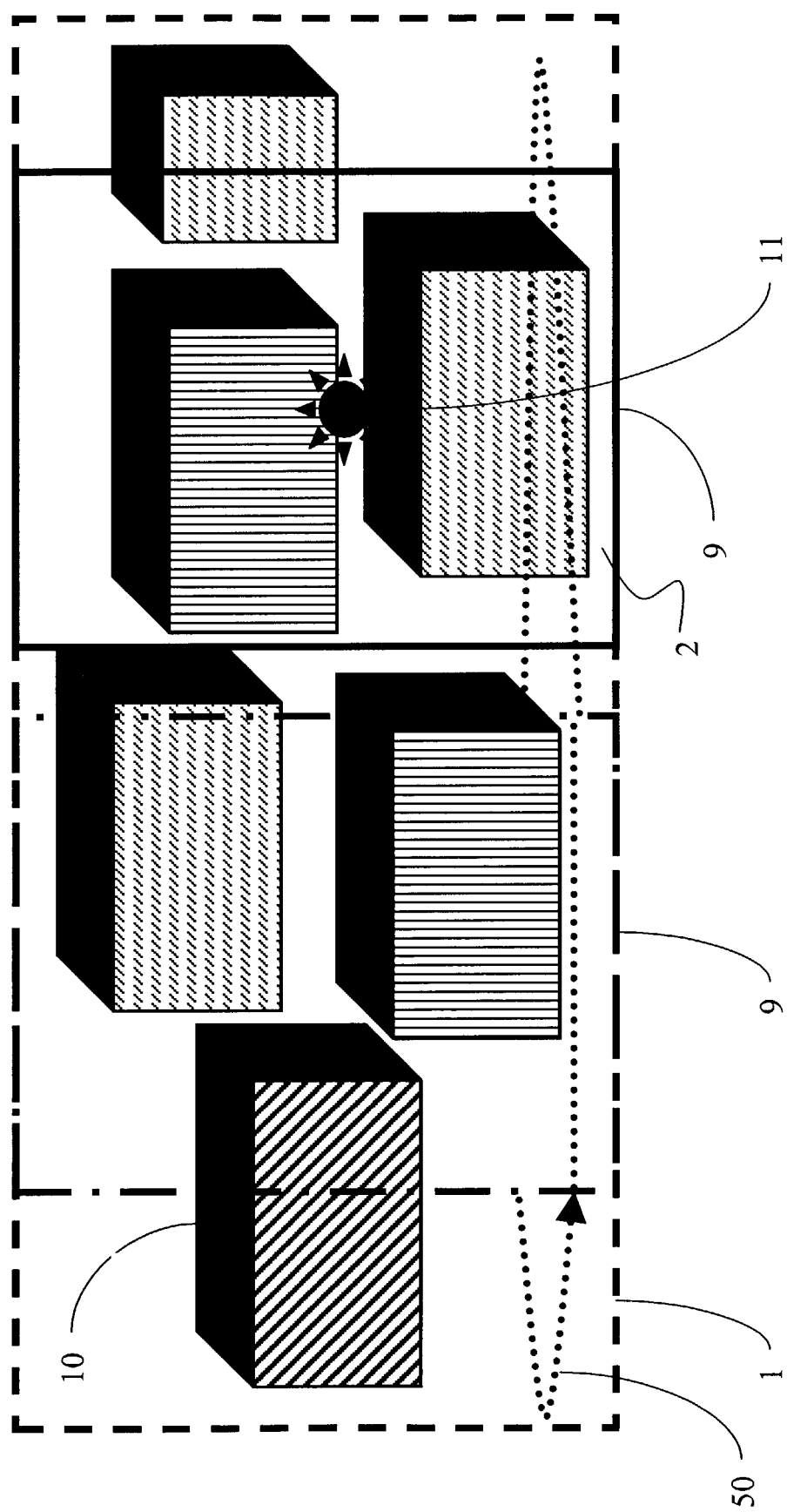
FIG. 9 illustrates electronic panning of a non-standard aspect ratio captured image with motion detection based displaying according to the concepts of the present invention.

A further embodiment of the present invention is illustrated in FIG. 9. In this embodiment, the selection of location of the electronic panning box 9 is motion-detection based.

As described above with respect to FIG. 8, an electronic panning box 9 moves across (as represented by dashed line 50) the captured wide aspect ratio image 1; however, upon detection of motion 11 by a motion detection circuit (described in more detail below) within the captured wide aspect ratio image 1, the electronic panning box 9 is moved immediately such that the area 11 associated with the detection of motion is substantially centered in the electronic panning box 9 and displayed, accordingly, on the standard aspect ratio display device 2. Moreover, the present invention can sound an alarm and/or flash an alarm on the screen where the motion is detected. It is not required that the electronic panning box 9 move across the captured image while waiting for the detection of motion to determine its next position; instead, the electronic panning box 9 can remain at a current selected position until a new motion-detected position is determined.

Furthermore, although the embodiment illustrated in FIG. 9 uses the automatic electronic panning display technique as described with respect to FIG. 8, the present invention can also utilize any of the display techniques described above with respect to FIGS. 4 through 7. Notwithstanding the display technique utilized, the present invention scans the entire captured wide aspect ratio image 1 for motion. When motion is detected in the captured wide aspect ratio image 1, the present invention positions the displayed portion of the captured wide aspect ratio image 1 such that the sensed motion area 11 is centered in the displayed section.

Figure 10:
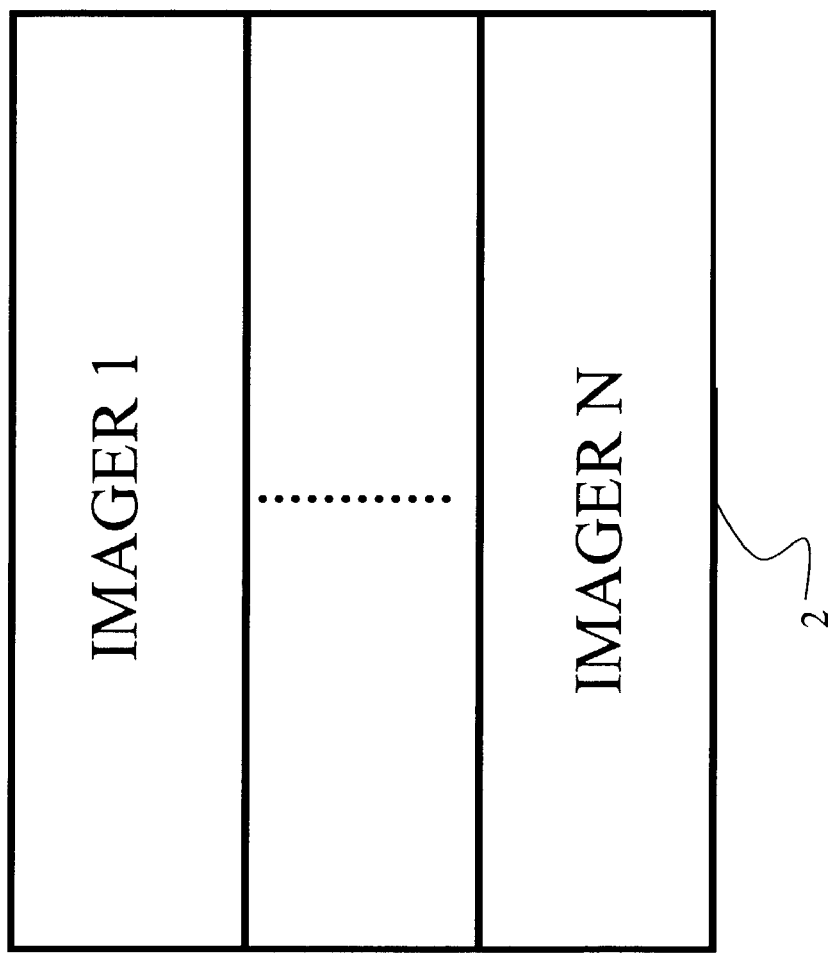
FIG. 10 illustrates multiple non-standard aspect ratio captured images being displayed according to the concepts of the present invention.

The present invention, as illustrated in FIG. 10, also enables the display of multiple wide aspect ratio images on a single standard aspect ratio display device 2 utilizing any of the display techniques described above with respect to FIGS. 4 through 9 wherein the display techniques can be assigned independently to each displayed wide aspect ratio image. In a preferred embodiment, a wide aspect ratio image from an imager is scaled by 1/N in the vertical dimension and $\frac{1}{3}^{rd}$ in the horizontal direction such that the standard aspect ratio display device 2 can display entire wide aspect ratio images from N wide aspect ratio imagers. This results in a display for an individual wide aspect ratio imager of 640 columns×480/N rows.

For example, if the standard aspect ratio display device 2 is set-up to simultaneously display images from three wide aspect ratio imagers, each wide aspect ratio image from an imager is scaled by $\frac{1}{3}^{rd}$ in the vertical dimension and $\frac{1}{3}^{rd}$ in the horizontal direction such that the standard aspect ratio display device 2 can display the entire wide aspect ratio images from the three wide aspect ratio imagers. This results in a display for an individual wide aspect ratio imager of 640 columns×160 rows.

It is noted that if the motion detection display mode of FIG. 9 is being utilized in conjunction with the display layout of FIG. 10, the display layout can be modified in response to the detection of motion. For example, the display layout of FIG. 10 can be completely overridden upon detection of motion, and the captured wide aspect ratio image having motion detected therein be displayed on the standard aspect ratio display device in the same manner as described above with respect to FIG. 9. More specifically, upon detection of motion, the display mode reverts to the mode of FIG. 9 and the portion of the captured wide aspect ratio image having motion therein fills the entire display area so that the user can properly monitor the motion sensed area.

On the other hand, the display layout would remain unchanged, but the individual display area of the display device assigned to the captured wide aspect ratio image having motion detected therein being modified to show the portion of the captured wide aspect ratio image having motion therein. This display can be enhanced with the inclusion of a flashing icon or flashing alarm to notify the user that this display area is active.

Figure 11:
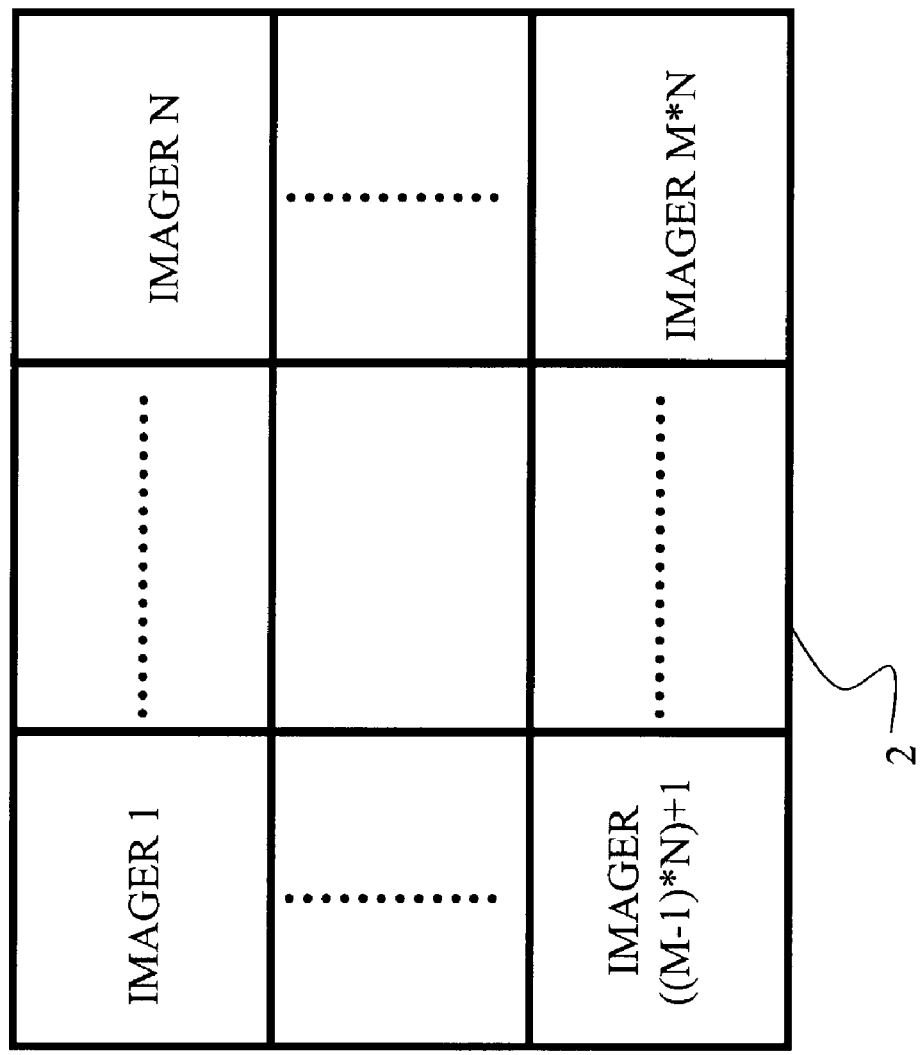
FIG. 11 illustrates another embodiment of multiple non-standard aspect ratio captured images being displayed according to the concepts of the present invention.

FIG. 11 illustrates a further embodiment for displaying multiple wide aspect ratio images on a single standard aspect ratio display device 2, having 640 columns and 480 rows, utilizing any of the display techniques described above with respect to FIGS. 4 through 9 wherein the display techniques can be assigned independently to each displayed wide aspect ratio image. In this embodiment, a wide aspect ratio image from a wide aspect ratio imager is scaled by 1/(M) in the vertical dimension and 1/((X/640)*N) in the horizontal direction wherein X is the number of columns in the wide aspect ratio imager such that the standard aspect ratio display device 2 can display the entire wide aspect ratio images from N*M wide aspect ratio imagers. This results in a display for an individual wide aspect ratio imager of 640/N columns×480/M rows.

For example, if the standard aspect ratio display device 2 is set-up to simultaneously display images from nine (9) wide aspect ratio imagers, each wide aspect ratio image from an imager is scaled by $\frac{1}{3}$th in the vertical dimension and $\frac{1}{3}^{rd}$ in the horizontal direction such that the standard aspect ratio display device 2 can display the entire wide aspect ratio images from the nine (9) wide aspect ratio imagers. This results in a display for an individual wide aspect ratio imager of 180 columns×160 rows.

It is noted that if the motion detection display mode of FIG. 9 is being utilized in conjunction with the display layout of FIG. 11, the display layout can be modified in response to the detection of motion. For example, the display layout of FIG. 11 can be completely overridden upon detection of motion, and the captured wide aspect ratio image having motion detected therein be displayed on the standard aspect ratio display device in the same manner as described above with respect to FIG. 9. More specifically, upon detection of motion, the display mode reverts to the mode of FIG. 9 and the portion of the captured wide aspect ratio image having motion therein fills the entire display area so that the user can properly monitor the motion sensed area.

On the other hand, the display layout would remain unchanged, but the individual display area of the display device assigned to the captured wide aspect ratio image having motion detected therein being modified to show the portion of the captured wide aspect ratio image having motion therein. This display can be enhanced with the inclusion of a flashing icon or flashing alarm to notify the user that this display area is active.

Lastly, upon detection of motion in the produced image data corresponding to the captured non-standard aspect ratio imaged scene, an alarm signal can be sent to either an operator indicating that motion in the captured non-standard aspect ratio imaged scene has been detected or to an automated monitoring system indicating that motion in the captured non-standard aspect ratio imaged scene has been detected. Moreover, upon detection of motion in the produced image data corresponding to the captured non-standard aspect ratio imaged scene, an alarm signal can be sent to either an operator indicating where in the captured non-standard aspect ratio imaged scene that motion has been detected or to an automated monitoring system indicating where in the captured non-standard aspect ratio imaged scene that motion has been detected. As explained above, there can be incorporated in the multiple display mode techniques of FIGS. 10 and 11 any of the display modes described above with respect to FIGS. 4–9. For example, beyond motion-detection panning, the manual or automatic electronic panning techniques described above can be employed.

Figure 12:
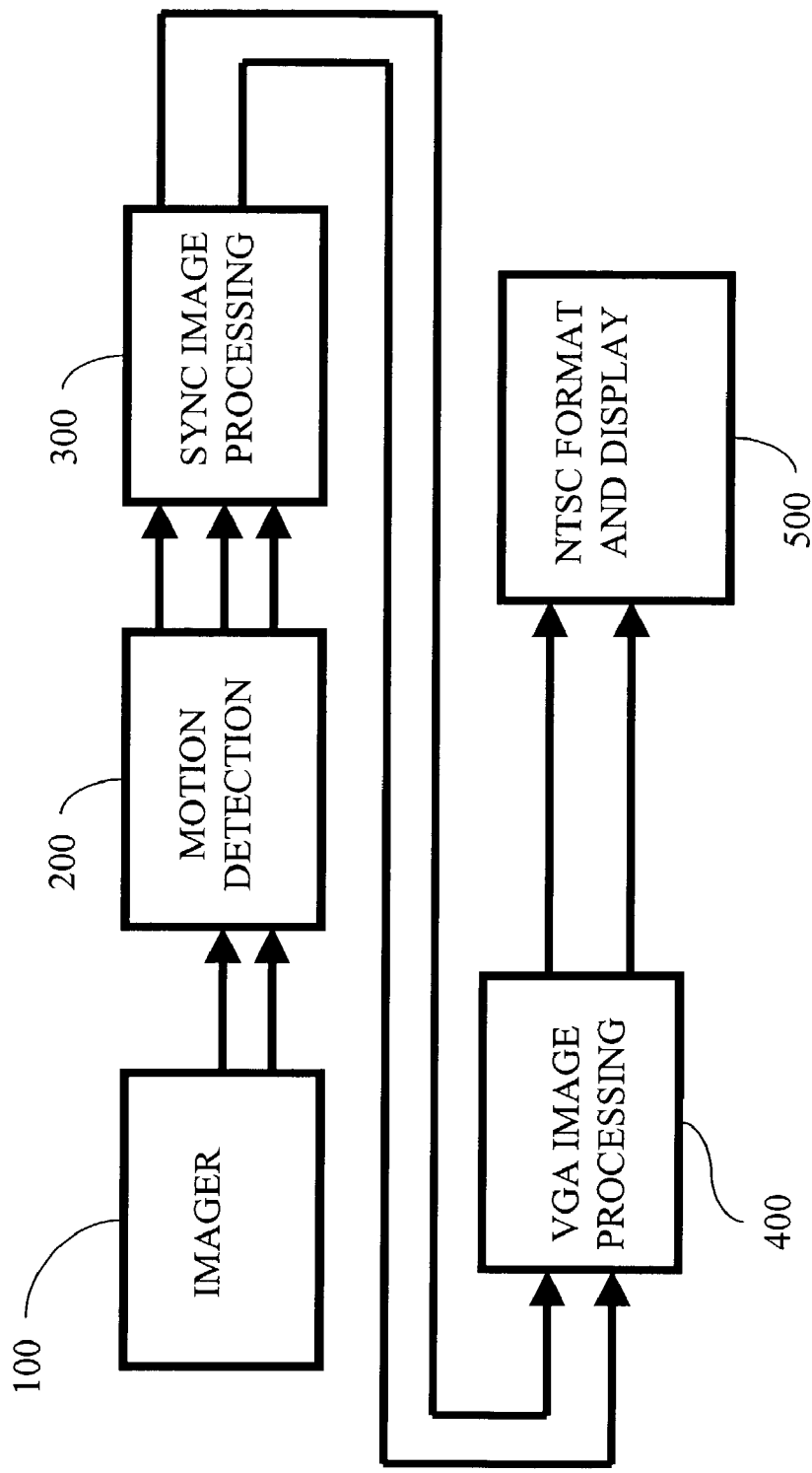
FIG. 12 illustrates a block diagram of a non-standard aspect ratio to standard aspect ratio imager/display system according to the concepts of the present invention.

FIG. 12 illustrates an example block diagram of imager and display systems configured in accordance with the present invention. More specifically, as illustrated in FIG. 12, a wide aspect ratio imager 100 captured an image and produces pixels of image data, as well as, control signals to indicate a beginning of a frame of pixels of image data and the beginning of each row of pixels of image data. The pixels of image data and the control signals may be fed into a motion detection circuit 200 that detects motion in the captured image.

The motion detection algorithms to be utilized by the present invention can be any conventional motion detection system or algorithm. In the preferred embodiment of the present invention, a set a regularly spaced image pixel columns are selected, for example, every tenth column in the captured wide aspect ratio image frame. By selecting every tenth column, the present invention can monitor 192 columns, out of the 1920 columns of relevant pixels of image data.

In this technique, the present invention calculates the sum of the pixel intensity values for each monitored column. These sums for each monitored column are updated every frame. If the sum of the pixel intensity values in a certain column of a frame "n" is significantly different than the sum in the same column of frame "n-1", the present invention detects that something has either moved into or out of that column, thereby detecting motion within the wide aspect ratio image.

By monitoring which, if any, pixel intensity value column sums have changed, the present invention can calculate a center of motion. The center of motion is calculated by taking the average of the column numbers of the leftmost and rightmost columns where a significant change in pixel intensity values has occurred or was detected.

Within the limits of the pixel array of the wide aspect ratio imager, as illustrated in FIG. 9, the center of motion 11 is set to be the center of the electronic panning box 9.

The present invention can increase or decrease the resolution of the motion detection algorithm by changing the spacing between columns that are monitored; i.e., by increasing the number of columns monitored, the resolution of the motion detection algorithm is increased.

The present invention uses the column sum difference rather than a difference in individual pixels in order to minimize storage requirements. However, if greater sensitivity is required, the motion detection algorithm of the present invention can be modified so as to monitor the differences between individual pixels in successive frames.

Monitoring across columns detects motion only in the horizontal direction. However, monitoring in the horizontal direction is sufficient for most surveillance applications. However, for other applications that require detection in other directions, the motion detection algorithm of the present invention can be modified so as to detect and track motion in any desired direction. For example, if motion in the vertical direction is desired, instead of monitoring a set of regularly spaced columns, the present invention could monitor a set of regularly spaced rows, employing a comparison in pixel sums between successive frames in the manner described above.

Lastly, the motion detection circuit 200 can send, in response to the detection of motion in the produced image data corresponding to the captured non-standard aspect ratio imaged scene, an alarm signal to an operator indicating that motion in the captured non-standard aspect ratio imaged scene has been detected or to an automated monitoring system indicating that motion in the captured non-standard aspect ratio imaged scene has been detected. Moreover, the motion detection circuit 200 can send, in response to the detection of motion in the produced image data corresponding to the captured non-standard aspect ratio imaged scene, a signal to an operator indicating where in the captured non-standard aspect ratio imaged scene that motion has been detected or to an automated monitoring system indicating where in the captured non-standard aspect ratio imaged scene that motion has been detected.

Back to FIG. 12, the pixels of image data and control signals, as well as, any signals relating to detected motion are passed onto a sync image processing circuit 300. In the sync image processing circuit 300, the control signals are modified so that the proper portion of the captured wide aspect ratio image, as illustrated in FIGS. 4–9, is displayed on a standard aspect ratio display device. The preferred method of manipulating the control signals, namely the new frame signal and the new row signal, will be discussed in more detail below.

In the display technique of FIG. 9 is being utilized, the speed of the electronic panning across the captured wide aspect ratio image can be adjustable either by setting the number of columns that the electronic panning box shifts every frame or by setting the number of frames that are displayed between the shifting of the electronic panning box across the captured wide aspect ratio image 1 or a combination of both. Furthermore, the speed of the electronic panning across the captured wide aspect ratio image can be predetermined, and thus set automatically, or set manually through a conventional user input device.

Since most all image processing algorithms and NTSC encoder interfaces are setup to deal with 640 columns/row, the present invention integrates the wide aspect ratio imager into a standard aspect ratio display system by selecting which 640 columns of the wide aspect ratio image are going to be displayed right at the beginning of image data processing. In the preferred embodiment of the present invention, this selection takes place in the sync image processing circuit 300. After the sync image processing circuit 300 selects the 640 columns of interest, according to any of the various methods discussed above with respect to FIGS. 4 through 9, the image data can be treated by a conventional VGA image processing circuit 400, as if it were coming from a standard 640 column/row VGA sensor.

Thereafter, the processed image data is fed to a NTSC format encoder and standard display device 500 so that a portion of the captured wide aspect ratio image can be displayed.

Within the image manipulation pipeline, the pixel data and synchronization information is transmitted as a 14-bit word. The 14-bit word includes a 12 bits of image data, which represents a pixel of image data, an "nfi" (New Frame In) bit, and an "nri" (New Row In) bit.

Figure 14:
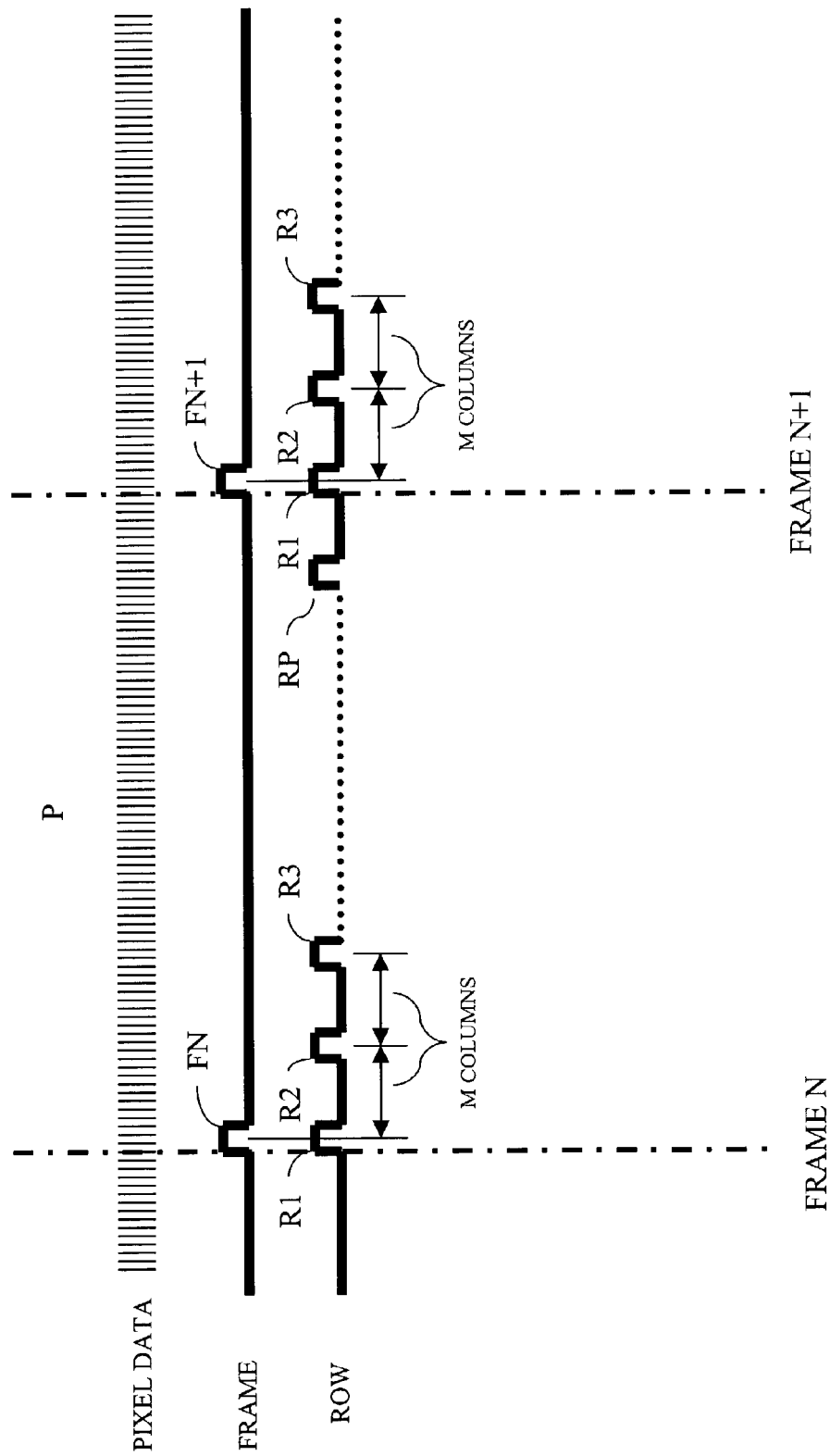
FIG. 14 illustrates a timing diagram of signals coming from a non-standard aspect ratio imager according to the concepts of the present invention.

In a wide aspect ratio imager, a stream of pixel data P is fed from the wide aspect ratio imager, as illustrated in FIG. 14. At the start of each new frame, the "nfi" bit, (FN and FN+1), is asserted for one pixel clock cycle, as illustrated in FIG. 14. Similarly, in a non-standard aspect ratio imager/display system, at the start of each new row, the "nri" bit, (R1, R2, R3 . . . RP) is asserted for one pixel clock cycle, as illustrated in FIG. 14. As illustrated in FIG. 14, the time between each assertion of the "nri" bit enables a number of pixels of image data to be fed out of the wide aspect ratio imager, wherein the number of pixels is equal to the number of columns M of the wide aspect ratio imager.

As noted above, the assertion of the "nfi" and "nri" bits need to be modified for the captured wide aspect ratio image to be properly displayed on a standard aspect ratio display device. This is realized in the present invention by delaying the assertion of the "nfi" and "nri" bits. By delaying the assertion of the "nfi" and "nri" bits, the present invention can easily control the apparent location of the first column of each frame of the captured wide aspect ratio image. This is especially useful in the display modes illustrated in FIGS. 4–9, where a 640 column wide subsection of the wide aspect ratio image is displayed.

In a preferred embodiment of the present invention, delaying the assertion of the "nfi" and "nri" bits can be a settable number of clock cycles. For example, when the delay is set to 0, the first column of the wide aspect ratio imager is also the first column of the conventional 640 column wide displayed section. The delay value can be changed on a per frame basis to slide the 640 column wide displayed section across the captured wide aspect ratio image, as discussed above with respect to FIGS. 4–9.

The maximum delay value for displaying on a standard aspect ratio display device is 640 columns less than the actual number of columns in the wide aspect ratio imager in order to line up the right edge of the displayed image with that of the captured wide aspect ratio image. Therefore, the delay amount is always less than the number of actual columns of pixels in the wide aspect ratio imager.

Figure 15:
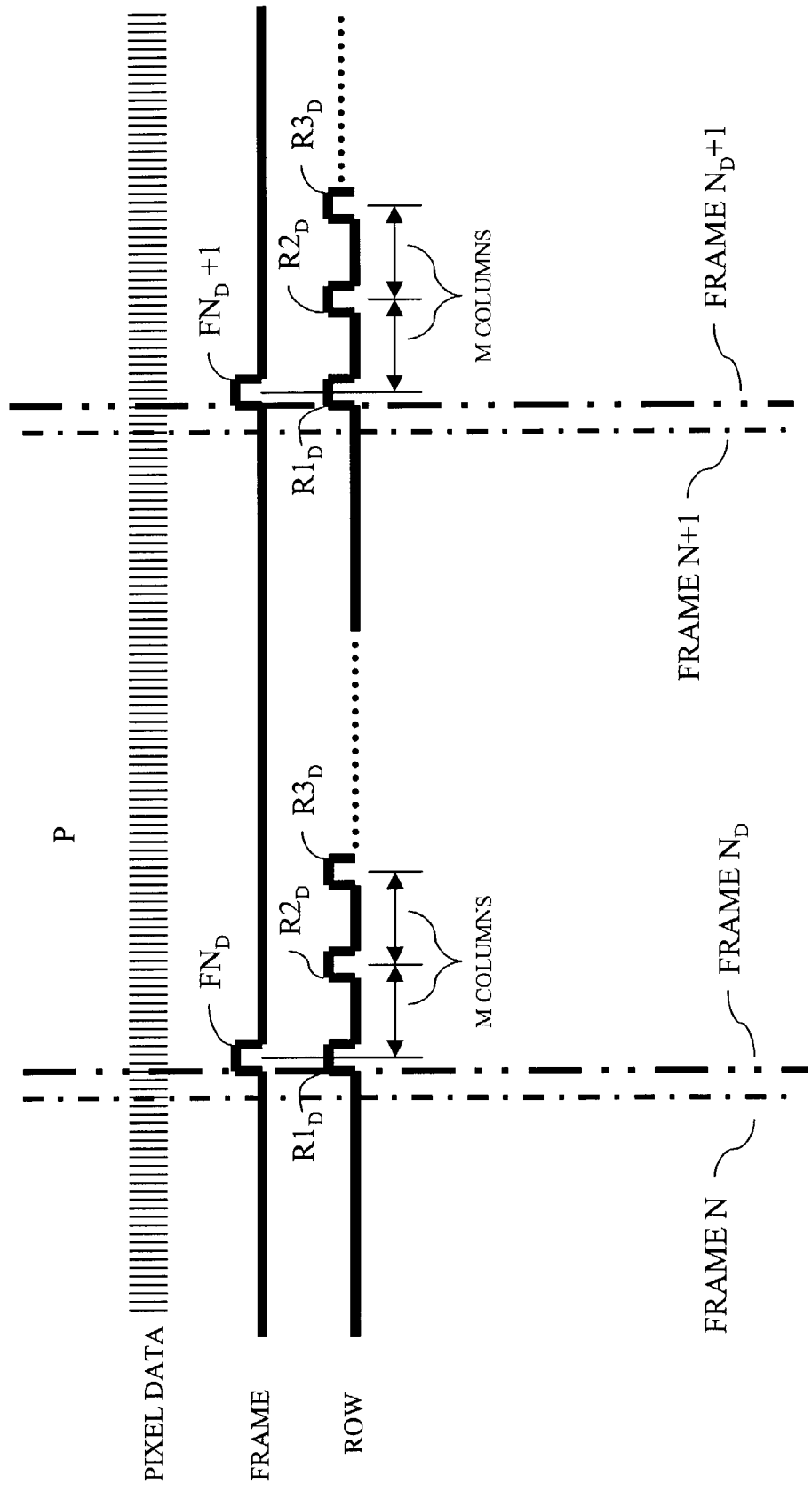
FIG. 15 illustrates a timing diagram of signals coming from a sync image processing circuit according to the concepts of the present invention.
Figure 16:
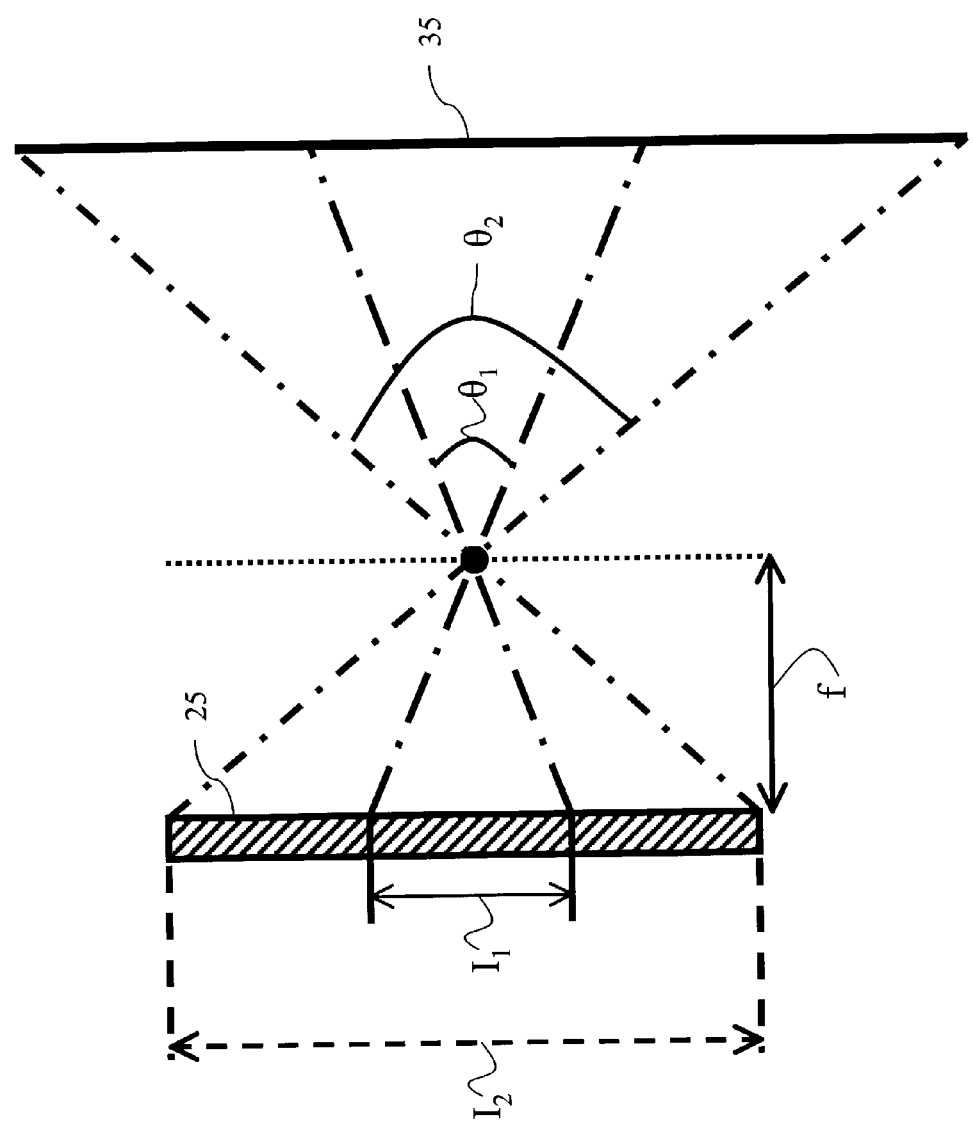
FIG. 16 illustrates an example of a change in a field of view of an imager.

FIG. 15 illustrates an example of the delaying of the assertion of the "nfi" and "nri" bits. As illustrated in FIG. 15, a stream of pixel data P is fed from the wide aspect ratio imager. In the sync image processing circuit 300, the original assertions of "nfi" bits, FN and FN+1, are delayed and output from the sync image processing circuit 300 as asserted "nfi" bits, $FN_D$ and $FN_D+1$, to establish the start of the delayed frames, FRAME $N_D$ and FRAME $N_D+1$, respectively. The actual amount of delay of the assertion of the "nfi" bits is dependent upon which of the display modes are being used, as illustrated in FIGS. 4–9. Thus, as illustrated in FIG. 15, at the start of each new frame, the "nfi" bit, ($FN_D$ and $FN_D+1$), is asserted for one pixel clock cycle.

Similarly, in the sync image processing circuit 300, the original assertions of "nri" bits, R1, R2, and R3, are delayed and output from the sync image processing circuit 300 as asserted "nri" bits, $R1_D$, $R2_D$, and $R3_D$, to indicate the start of a new row. The actual amount of delay of the assertion of the "nri" bits is dependent upon which of the display modes are being used, as illustrated in FIGS. 4–9. Thus, as illustrated in FIG. 15, at the start of each new row, the "nri" bit, ($R1_D$, $R2_D$, and $R3_D$) is asserted for one pixel clock cycle.

As illustrated in FIG. 15, the time between each assertion of the "nri" bit enables a number of pixels of image data to be fed out of the wide aspect ratio imager, wherein the number of pixels is equal to the number of columns M of the wide aspect ratio imager. It is noted, for the preferred embodiment of the present invention, that although the assertion of the "nfi" and "nri" bits may be delayed for proper displaying of a captured wide aspect ratio image upon a standard aspect ratio display device, the throughput of the stream of pixel data remains constant and is not delayed.

Table 1 illustrates sample delay values that can be used in conjunction with the embodiments illustrated by FIGS. 4–9 for a wide aspect ratio imager having 1920 columns and the display device being a standard aspect ratio display device.

TABLE 1

| FIG. | Description | Delay Value |
| --- | --- | --- |
| 4 | Show left 640 columns | 0 |
| 5 | Show middle 640 columns | 640 |
| 6 | Show rightmost 640 columns | 1280 |
| 7 | Manual Panning | Variable - set by user |
| 8 | Automatic Panning | Variable - increment 0 to 1280, then back to 0 and so on. |
| 9 | Motion Detection | As in 4–8 except if motion is detected set the delay to (Center of motion - 320) with a minimum value of 0 and maximum of 1280. |

Figure 13:
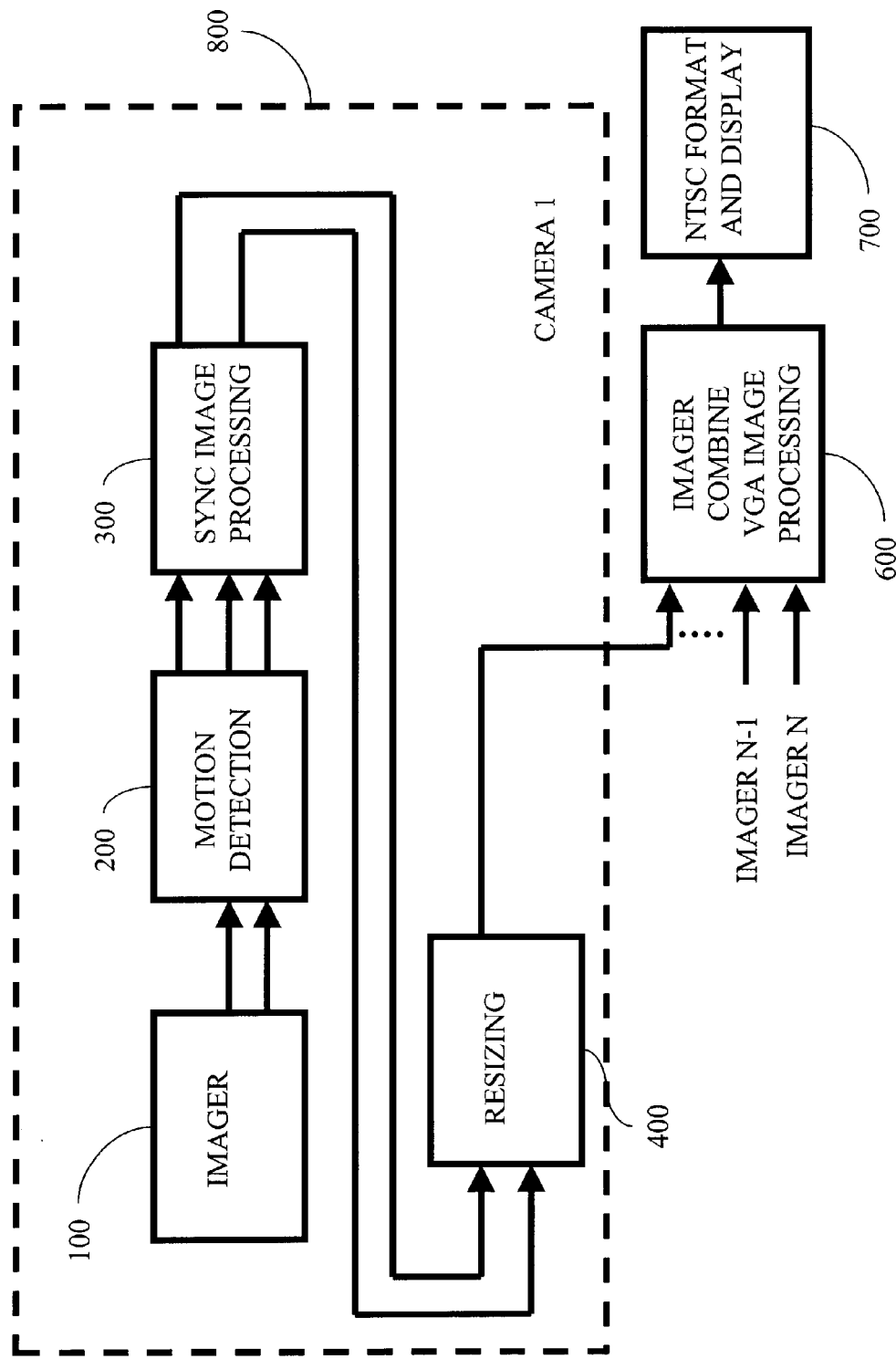
FIG. 13 illustrates a block diagram of a standard aspect ratio display system displaying multiple non-standard aspect ratio captured images according to the concepts of the present invention.

FIG. 13 illustrates another example block diagram of imager and display system configurations in accordance with the present invention. More specifically, as illustrated in FIG. 13, a wide aspect ratio imaging system 800 includes a wide aspect ratio imager 100 for capturing an image and producing pixels of image data as well as control signals to indicate a beginning of a frame of pixels of image data and the beginning of each row of pixels of image data. The pixels of image data and the control signals may be fed into a motion detection circuit 200 that detects motion in the captured image.

As noted above, the motion detection algorithm or algorithms to be utilized by the present invention can be any conventional motion detection system or algorithm. In the preferred embodiment of the present invention, a set of regularly spaced columns is selected; for example, every tenth column in the captured wide aspect ratio image frame. By selecting every tenth column, the present invention can monitor 192 columns, out of the 1920 columns of relevant pixels of image data.

The present invention calculates the sum of the pixel intensity values for each monitored column. These sums for each monitored column are updated every frame. If the sum of the pixel intensity values in a certain column of a frame "n" is significantly different than the sum in the same column of frame "n-1", the present invention detects that something has either moved into or out of that column, thereby detecting motion within the wide aspect ratio image.

By monitoring which columns have changed, the present invention can calculate a center of motion. The center of motion is calculated by taking the average column number of the leftmost and rightmost columns where a significant change in pixel intensity values has occurred or was detected.

Within the limits of the pixel array of the wide aspect ratio imager, as illustrated in FIG. 9, the center of motion 11 is set to be the center of the electronic panning box 9.

The present invention can increase or decrease the resolution of the motion detection algorithm by changing the spacing between columns that are monitored; i.e., by increasing the number of columns monitored, the resolution of the motion detection algorithm is increased.

The present invention uses the column sum difference rather than a difference in individual pixels in order to minimize storage requirements. However, if greater sensitivity is required, the motion detection algorithm of the present invention can be modified so as to monitor the differences between individual pixels in successive frames.

Monitoring across columns detects motion only in the horizontal direction. However, monitoring in the horizontal direction is sufficient for most surveillance applications. However, for other applications that require detection in other directions, the motion detection algorithm of the present invention can be modified so as to detect and track motion in any desired direction. For example, if motion in the vertical direction is desired, instead of monitoring a set of regularly spaced columns, the present invention could monitor a set of regularly spaced rows.

Back to FIG. 13, the pixels of image data and control signals, as well as, any signals relating to detected motion are passed onto a sync image processing circuit 300. In the sync image processing circuit 300, the control signals are modified so that the proper portion of the captured wide aspect ratio image, as illustrated in FIGS. 4–9, can be displayed on a standard aspect ratio display device. The preferred method of manipulating the control signals, employing the new frame signal and the new row signal, can be implemented in the manner discussed in detail above.

The modified captured wide aspect ratio image is fed to a resizing circuit 400. The resizing circuit 400 resizes modified captured wide aspect ratio image so as to fit the area on the standard aspect ratio display device that has been assigned to the modified captured wide aspect ratio image. The resized modified captured wide aspect ratio image is fed to an imager combining and VGA processing circuit 600 where various resized modified captured wide aspect ratio image are combined and VGA image processed so that the images can be properly displayed on a standard aspect ratio display device.

Thereafter, the VGA processed image data is fed to a NTSC format encoder and standard display device 700 so that portions of the captured wide aspect ratio images can be properly displayed.

For security and other applications a user can be supplied with a joystick-like control used to select any display subsection being displayed so as to display the selected subsection using the entire screen.

It is also noted that each of a plurality of wide aspect ratio imagers could be independently put in any of the display modes described previously with respect to FIGS. 4–9, whereby each subsection can have a different display mode.

In a preferred embodiment of the present invention, in order to implement the two display layouts of FIGS. 10 and 11, the present invention processes a 1920 column by 480 row image from a wide aspect ratio imager, and then resizes the captured wide aspect ratio image to a 640 column by 160 row image. The imager combining and VGA processing circuit 600 can accept the 640 column by 160 row images from two other similar imager pipelines and put all three images into the same NTSC data formatter and display module 700.

Figure 17:
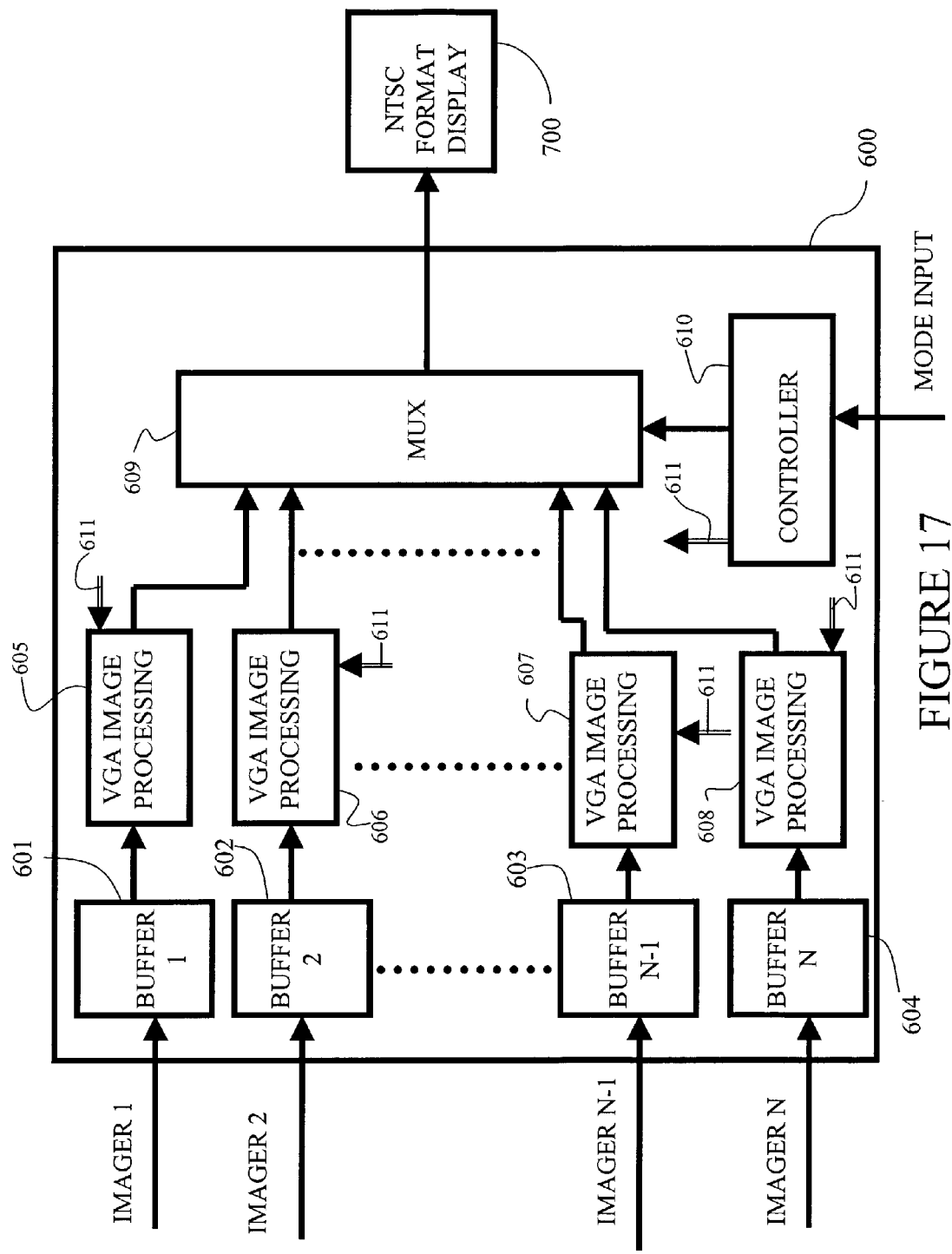
FIG. 17 illustrates one embodiment of an imager combining and VGA processing circuit, according to the concepts of the present invention.

FIG. 17 illustrates an embodiment of an imager combining and VGA processing circuit. As illustrated in FIG. 17, an imager combining and VGA processing circuit 600 includes a number of image buffers, 601, 602, 603, and 604, the actual number of buffers would be equal to the number of imagers that can be displayed on the standard aspect ratio display device; for example, the number of buffers for the display mode illustrated in FIG. 11 would be M*N, which receive image data from various wide aspect ratio imagers. The image data is buffered in the image buffers 601, 602, 603, and 604 until the image data is needed for displaying upon the standard aspect ratio display device.

The flow of image data from the various image buffers is fed to various VGA image processing circuits (605, 606, 607, and 608) for proper VGA processing. The VGA processing routines that are performed upon the image can be independently determined and controlled for each wide aspect ratio imager path. The control of the processing may be delegated to controller 610, which can produce control signals 611 to select the VGA processing routines each VGA image processing circuit performs. Thereafter, the VGA processed image data is gated by a multiplexer 609 that is, in turn, controlled by controller or control circuit 610. In response to control signals from the controller or control circuit 610, the multiplexer 609 selects the image data from the proper VGA image processing circuit. Thereafter, the gated image data from the multiplexer 609 is fed to a NTSC format encoder and standard display device 700 so that portions of the captured wide aspect ratio images can be properly displayed.

The controller or control circuit 610 produces the control signals in response to mode input data entered by a user or operator. This mode input data may indicate the number of imagers being displayed and/or the display mode for each individual display area wherein the display mode or technique can be assigned independently to each displayed wide aspect ratio image. The mode input data may also indicate the display option for the standard aspect ratio display device or individual displayed wide aspect ratio image when motion is detected.

It is further noted that the imager/display system of the present invention may also include adaptive sensitivity control, on a pixel-by-pixel basis. More specifically, the present invention may include adaptively controlled sensitivity, on a pixel-by-pixel basis, to expand a dynamic range of the digital imager as set forth in co-pending patent application Ser. No. 10/037,885, entitled "Adaptive Sensitivity Control, On A Pixel-By-Pixel Basis, For A Digital Imager," and filed on Jan. 4, 2002. The entire content of co-pending patent application Ser. No. 10/037,885 is hereby incorporated by reference.

In summary, the present invention displays an area of interest corresponding to a portion of a captured non-standard aspect ratio image, the portion being a displayable imaged area within the captured non-standard aspect ratio image. To realize this, the present invention images a non-standard aspect ratio image area with a digital imager to produce pixels of image data. The digital imager has a two-dimensional array of image sites, the two-dimensional array having a number of columns and a number of rows, each row of the two-dimensional array having a plurality of image sites such that an individual image site corresponds directly to a single column of the two-dimensional array, each image site producing a pixel of image data.

The present invention displays a portion of the produced pixels of image data corresponding to the captured non-standard aspect ratio image beginning, for a given frame of pixels of image data, at a column of pixels of image data corresponding to a first predetermined column of the two-dimensional array of image sites, the displayed portion of the produced pixels image data having a number of columns of display pixels, the number of columns of display pixels being less than the number of columns of image sites. The present invention detects motion in the produced pixels of image data corresponding to the captured non-standard aspect ratio image. In response to the detection of motion in the produced pixels of image data corresponding to the captured non-standard aspect ratio image, a motion responsive portion of the produced pixels of image data corresponding to the captured non-standard aspect ratio image is displayed. The motion responsive portion of the produced pixels of image data corresponds to a window of the produced pixels of image data having motion detected therein.

The process for detecting of motion selects pixels of image data from a set of regularly spaced windows of pixels of image data; generates a sum for each selected window of image data for every frame of pixels of image data; compares a sum of pixels of image data for a certain selected window generated from a first frame of pixels of image data with a sum of pixels of image data for the certain selected window generated from a second frame of pixels of image data; and detects motion in a captured non-standard aspect ratio image corresponding to the certain selected window when a difference between the sum of pixels of image data for the certain selected window generated from the first frame of pixels of image data and the sum of pixels of image data for the certain selected window generated from the second frame of pixels of image data is greater than a predetermined threshold.

A center of the motion responsive portion of the produced pixels of image data corresponds to the certain selected window having the difference between the sum of pixels of image data for the certain selected window generated from the first frame of pixels of image data and the sum of pixels of image data for the certain selected window generated from the second frame of pixels of image data that is greater than a predetermined threshold. The set of regularly spaced windows of pixels of image data, in a preferred embodiment, is a set of regularly spaced columns of pixels of image data.

While the above described techniques were directed to a specific wide aspect ratio imager and a 4:3 aspect ratio display device, the present invention is applicable to any size imager and any size display device if the aspect ratio of the imager is different from that of the display. If the imager resolution is less than the display, the image can be scaled up to match the smaller dimension to the display. Then the larger dimension can be handled in the fashion that is described above. Since these techniques can be used in the horizontal or vertical domain it is not critical whether the smaller dimension is the height or the width.

Moreover, the present invention has been described using hardware embodiments; however, it is noted that the various embodiments of the present invention can be readily carried out in software, hardware, firmware, or a combination or any of these platforms. Furthermore, the various embodiments of the present invention can be carried out in real-time on the image data, as it is being produced by the imager, or carried out in a delayed fashion on image data from the imager that has been stored.

While various examples and embodiments of the present invention have been shown and described, it will be appreciated by those skilled in the art that the spirit and scope of the present invention are not limited to the specific description and drawings herein, but extend to various modifications and changes all as set forth in the following claims.

What is claimed is:

1. A method of displaying a portion of a captured non-standard aspect ratio imaged scene, comprising:
   generating a non-standard aspect ratio imaged scene with a non-standard aspect ratio digital imager;
   displaying, using electronic panning, an electronic panned portion of the non-standard aspect ratio imaged scene using a standard-aspect ratio monitor by sequentially displaying a plurality of panned portions of the non-standard aspect ratio imaged scene at a frame rate to electronically pan across the non-standard aspect ratio imaged scene, wherein the frame rate is determined automatically or manually;
   detecting motion in the generated non-standard aspect ratio imaged scene; and
   displaying, in response to the detection of motion in the generated non-standard aspect ratio imaged scene, a motion responsive portion of the non-standard aspect ratio imaged scene using the standard aspect ratio monitor, the motion responsive portion of the non-standard aspect ratio imaged scene corresponding to a window of the generated non-standard aspect ratio imaged scene having motion detected therein.

2. The method as claimed in claim 1, wherein the detecting of motion includes:
   selecting pixels of the generated non-standard aspect ratio imaged scene from a set of regularly spaced windows of pixels of the generated non-standard aspect ratio imaged scene;
   generating a sum for each selected window for selected frames of the generated non-standard aspect ratio imaged scene;
   comparing the sum of a certain selected window generated from a first frame of the generated non-standard aspect ratio imaged scene with the sum of the certain selected window generated from a second frame of the generated non-standard aspect ratio imaged scene; and
   detecting motion in an imaged area corresponding to the certain selected window when a difference between the sum of the certain selected window generated from the first frame of the generated non-standard aspect ratio imaged scene and the sum for the certain selected window generated from the second frame of the generated non-standard aspect ratio imaged scene is greater than a predetermined threshold.

3. The method as claimed in claim 2, wherein the set of regularly spaced windows of pixels of image data is a set of regularly spaced columns of pixels of image data.

4. The method as claimed in claim 2, wherein a center of the motion responsive portion corresponds to the certain selected window having the difference between the sum for the certain selected window generated from the first frame of the generated non-standard aspect ratio imaged scene and the sum for the certain selected window generated from the second frame of the generated non-standard aspect ratio imaged scene that is greater than the predetermined threshold.

5. The method as claimed in claim 1, wherein the non-standard aspect ratio imaged scene comprises a wide aspect ratio imaged scene.

6. The method of claim 1, wherein:
   generating the non-standard aspect ratio imaged scene comprises imaging the non-standard aspect ratio imaged scene with the non-standard aspect ratio digital imager to produce the non-standard aspect ratio imaged scene from pixels of image data, the non-standard aspect ratio digital imager having a two-dimensional array of image sites, the two-dimensional array having a number of columns and a number of rows, each row of the two-dimensional array having a plurality of image sites such that an individual image site corresponds directly to a single column of the two-dimensional array, each image site producing a pixel of image data;
   displaying the portion of the non-standard aspect ratio imaged scene comprises displaying at least a portion of the produced pixels of image data corresponding to the captured non-standard aspect ratio imaged scene beginning, for a given frame of pixels of image data, at a column of pixels of image data corresponding to a first predetermined column of the two-dimensional array of image sites, the displayed portion of the produced pixels of image data having a number of columns of display pixels, the number of columns of display pixels being different than the number of columns of image sites;
   detecting motion in the generated non-standard aspect ratio imaged scene comprises detecting motion in the produced pixels of image data corresponding to the captured non-standard aspect ratio imaged scene; and
   displaying the motion responsive portion of the non-standard aspect ratio imaged scene comprises displaying, in response to the detection of motion in the produced pixels of image data corresponding to the captured non-standard aspect ratio imaged scene, a motion responsive portion of the produced pixels of image data corresponding to the captured non-standard aspect ratio imaged scene, the motion responsive portion of the produced pixels of image data corresponding to a window of the produced pixels of image data having the motion detected therein.

7. The method of claim 6, wherein:
   imaging the non-standard aspect ratio imaged scene comprises imaging a wide area with the non-standard aspect ratio digital imager to produce pixels of image data; and
   displaying the portion of the non-standard aspect ratio imaged scene comprises displaying, using electronic panning, an electronic panned portion of the produced pixels of image data corresponding to the captured non-standard aspect ratio imaged scene.

8. The method as claimed in claim 1, further comprising:
   sending, in response to the detection of motion in the generated non-standard aspect ratio imaged scene, an alarm signal to an operator indicating that motion in the captured non-standard aspect ratio imaged scene has been detected.

9. The method as claimed in claim 8, further comprising:
   sending, in response to the detection of motion in the generated non-standard aspect ratio imaged scene, a signal to an operator indicating where in the captured non-standard aspect ratio imaged scene that motion has been detected.

10. The method as claimed in claim 1, further comprising:
sending, in response to the detection of motion in the generated non-standard aspect ratio imaged scene, an alarm signal to an automated monitoring system indicating that motion in the captured non-standard aspect ratio imaged scene has been detected.

11. The method as claimed in claim 10, further comprising:
sending, in response to the detection of motion in the generated non-standard aspect ratio imaged scene, a signal to an automated monitoring system indicating where in the captured non-standard aspect ratio imaged scene that motion has been detected.

12. The method as claimed in claim 1, wherein the digital imager has a 12:3 aspect ratio and the portion of the generated non-standard aspect ratio imaged scene is displayed using a 4:3 aspect ratio.

13. The method as claimed in claim 1, wherein the displayed portion comprises a plurality of columns, and a beginning column of the displayed portion for a given frame of pixels of image data is determined automatically.

14. The method as claimed in claim 1, wherein the displayed portion comprises a plurality of columns, and a beginning column of the displayed portion for a given frame of pixels of image data is determined manually.

15. An imaging device to enable a displaying of at least a portion of a captured non-standard aspect ratio imaged scene, comprising:
a non-standard aspect ratio digital imager capable of producing a non-standard aspect ratio image;
an image processing circuit, operatively connected to said non-standard aspect ratio digital imager, to process the produced non-standard aspect ratio image to display, using electronic panning, an electronic panned portion of the non-standard aspect ratio image using a standard aspect ratio monitor by sequentially displaying a plurality of panned portions of the non-standard aspect ratio imaged scene at a frame rate wherein the frame rate is determined automatically or manually; and
a motion detection circuit, operatively connected to said non-standard aspect ratio digital imager and said image processing circuit, to detect motion in the produced non-standard aspect ratio imaged scene;
said image processing circuit, in response to the detection of motion, processing if the produced non-standard aspect ratio imaged scene to enable a displaying of a motion responsive portion of the non-standard aspect ratio imaged scene using the standard aspect ratio monitor, the motion responsive portion of the non-standard aspect ratio imaged scene corresponding to a window of the generated non-standard aspect ratio imaged scene having motion detected therein.

16. The imaging device as claimed in claim 15, wherein said motion detection circuit selects pixels of image data from a set of regularly spaced windows of pixels of image data; generates a sum for each selected window of image data for selected frames of pixels of image data; compares a sum of pixels of image data for a certain selected window generated from a first frame of pixels of image data with a sum of pixels of image data for the certain selected window generated from a second frame of pixels of image data; and detects motion in an imaged area corresponding to the certain selected window when a difference between the sum of pixels of image data for the certain selected window generated from the first frame of pixels of image data and the sum of pixels of image data for the certain selected window generated from the second frame of pixels of image data is greater than a predetermined threshold.

17. The imaging device as claimed in claim 16, wherein a center of the motion responsive portion of the non-standard aspect ratio imaged scene corresponds to the certain selected window having the difference between the sum of pixels of image data for the certain selected window generated from the first frame of pixels of image data and the sum of pixels of image data for the certain selected window generated from the second frame of pixels of image data that is greater than the predetermined threshold.

18. The imaging device as claimed in claim 16, wherein the set of regularly spaced windows of pixels of image data is a set of regularly spaced columns of pixels of image data.

19. The imaging device as claimed in claim 15, wherein the non-standard aspect ratio imaged scene comprises a wide aspect ratio imaged scene and said non-standard aspect ratio digital imager comprises a wide aspect ratio digital imager.

20. The imaging device of claim 15, wherein:
the non-standard aspect ratio digital imager comprises a two-dimensional array of image sites, said two-dimensional array having a number of columns and a number of rows, each row of the two-dimensional array having a plurality of image sites such that an individual image site corresponds directly to a single column of said two-dimensional array, each image site producing a pixel of image data;
the image processing circuit is configured to process the produced non-standard aspect ratio pixels of image data to enable a displaying of a portion of the produced pixels of image data corresponding to the captured non-standard aspect ratio imaged scene beginning, for a given frame of pixels of image data, at a column of pixels of image data corresponding to a first predetermined column of said two-dimensional array of image sites, the displayed portion of the produced pixels of image data having a number of columns of display pixels, the number of columns of display pixels being different than the number of columns of image sites;
the motion detection circuit, is configured to detect motion in the produced pixels of image data corresponding to the captured non-standard aspect ratio imaged scene; and
the image processing circuit is further configured to process, in response to detected motion, the produced non-standard aspect ratio pixels of image data to enable a displaying a motion responsive portion of the produced pixels of image data corresponding to the captured non-standard aspect ratio imaged scene, the motion responsive portion of the produced pixels of image data corresponding to a window of the produced pixels of image data having motion detected therein.

21. The imaging device as claimed in claim 15, wherein said motion detection circuit sends, in response to the detection of motion in the produced image data corresponding to the captured non-standard aspect ratio imaged scene, an alarm signal to an operator indicating that motion in the captured non-standard aspect ratio imaged scene has been detected.

22. The imaging device as claimed in claim 21, wherein said motion detection circuit sends, in response to the detection of motion in the produced image data corresponding to the captured non-standard aspect ratio imaged scene, a signal to an operator indicating where in the captured non-standard aspect ratio imaged scene that motion has been detected.

23. The imaging device as claimed in claim 15, wherein said motion detection circuit sends, in response to the detection of motion in the produced image data corresponding to the captured non-standard aspect ratio imaged scene, an alarm signal to an automated monitoring system indicating that motion in the captured non-standard aspect ratio imaged scene has been detected.

24. The imaging device as claimed in claim 23, wherein said motion detection circuit sends, in response to the detection of motion in the produced image data corresponding to the captured non-standard aspect ratio imaged scene, a signal to an automated monitoring system indicating where in the captured non-standard aspect ratio imaged scene that motion has been detected.

25. The imaging device as claimed in claim 15, wherein said non-standard aspect ratio digital imager has a 12:3 aspect ratio and the portion of the produced pixels of image data corresponding to the captured non-standard aspect ratio imaged scene is displayed using a 4:3 aspect ratio monitor.

26. The imaging device as claimed in claim 15, wherein a beginning column of the displayed portion, for a given frame of pixels of image data is determined automatically.

27. The imaging device as claimed in claim 15, wherein a beginning column of the displayed portion, for a given frame of pixels of image data is determined manually.

* * * * *